United States Patent [19]

Takizawa

[11] Patent Number: 4,658,787
[45] Date of Patent: Apr. 21, 1987

[54] METHOD AND APPARATUS FOR ENGINE CONTROL

[75] Inventor: Satoshi Takizawa, Yokosuka, Japan

[73] Assignee: Nissan Motor Company, Limited, Kanagawa, Japan

[21] Appl. No.: 696,434

[22] Filed: Jan. 30, 1985

[30] Foreign Application Priority Data

Feb. 1, 1984 [JP] Japan ................................. 59-15053
Feb. 1, 1984 [JP] Japan ................................. 59-15055
Feb. 1, 1984 [JP] Japan ................................. 59-15056

[51] Int. Cl.⁴ ............................................. F02P 5/04
[52] U.S. Cl. ................................. 123/418; 123/339; 123/422; 123/423
[58] Field of Search ............... 123/436, 425, 494, 478, 123/339, 426, 422, 418, 416

[56] References Cited

U.S. PATENT DOCUMENTS

| 4,401,079 | 8/1983 | Takizawa | 123/425 |
| 4,418,669 | 12/1983 | Johnson | 123/425 |
| 4,513,718 | 4/1985 | Ishii | 123/425 |
| 4,517,944 | 5/1985 | Inoue | 123/425 |
| 4,556,030 | 12/1985 | Aono | 123/425 |

Primary Examiner—Ronald B. Cox
Attorney, Agent, or Firm—Schwartz, Jeffery, Schwaab, Mack, Blumenthal & Evans

[57] ABSTRACT

A method and apparatus for controlling an internal combustion engine. The amount of fuel delivered to the engine is controlled in direct proportion to the rate of air flow introduced into an engine cylinder. The timing of ignition of the engine in controlled based upon a difference between the actual torque actually produced on the engine output shaft and the ideal torque required on the engine output shaft at the engine speed, thereby bringing the actual torque quite close to the ideal torque.

17 Claims, 33 Drawing Figures

FIG. 12
(A) N
(B) Q
(C) Qa
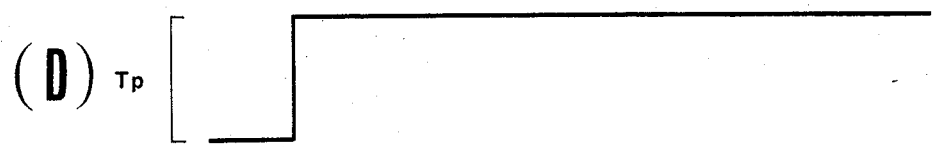
(D) Tp
(E) Y  RICH / LEAN
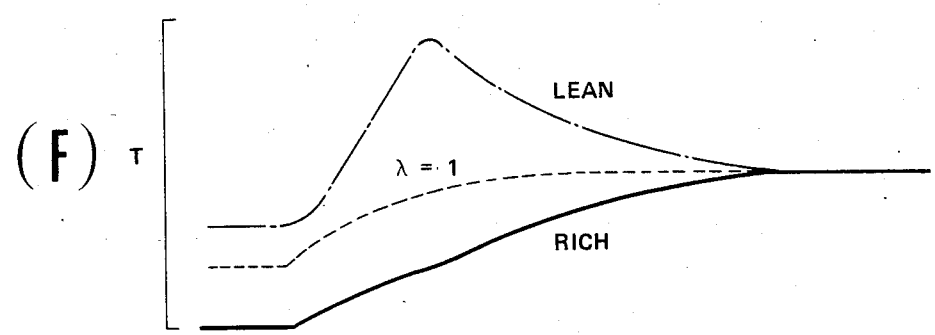
(F) T  LEAN, $\lambda = 1$, RICH FIG. 13
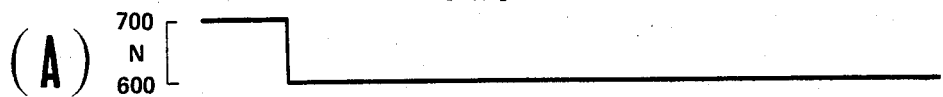
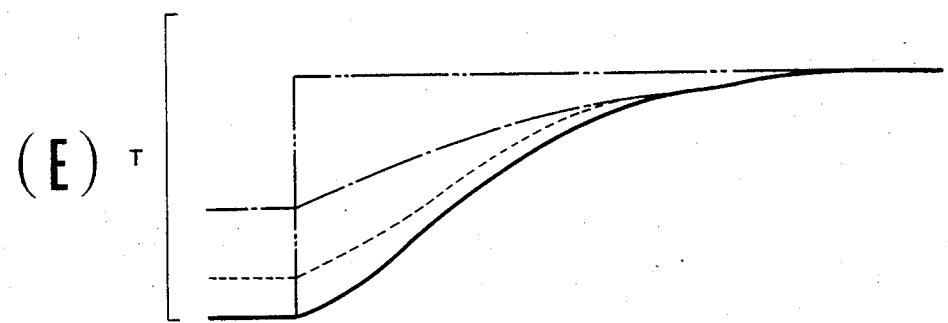
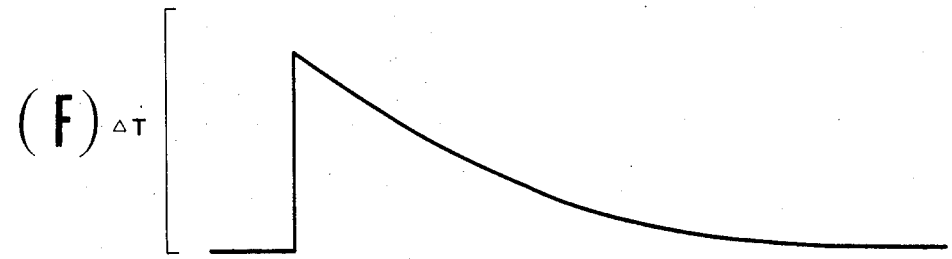

METHOD AND APPARATUS FOR ENGINE CONTROL

BACKGROUND OF THE INVENTION

This invention relates to a method and apparatus for the control of an internal combustion engine. While the general principles and teachings hereinafter disclosed are applicable to all combustion engines, the invention is hereinafter described in detail in connection with its application to a fuel-injected, spark-ignition internal combustion engine.

In the art of internal combustion engines, it is common practice to control the amount of fuel delivered to the engine in direct proportion to the rate of air flow introduced into the induction passage while controlling the ignition timing of the engine as a function of engine speed and induction passage air flow rate during normal engine operation and as a function of engine speed during engine idle operation.

With such a conventional engine control, several difficulties arise when a stepped change occurs in engine speed at idle or cruise conditions where the throttle valve is at or near its closed position. With the throttle valve being at or near its closed position, the flow through the induction passage is sonic and the induction passage air flow remains constant regardless of engine speed changes. Although the amount of fuel delivery to the engine changes in inverse proportion to the engine speed, the air flow actually introduced into the engine cylinder changes with a first order time lag relative to the engine speed change due to the influence of induction passage volume and cylinder stroke volume, shifting the air-fuel ratio from a desired value. The air-fuel ratio is enriched to an excessive extent causing unstable engine operation particularly when a great engine speed drop occurs with the throttle valve at or near its closed position.

Furthermore, the engine output torque increases with a first order time lag relative to the engine speed drop due to the time lag associated with the change of the engine cylinder air flow rate, causing engine stall particularly when a stepped drop occurs in engine speed during a transmission gear change.

Therefore, the present invention provides an improved engine control method and apparatus which can bring the actual torque produced at the engine output shaft quite close to the ideal torque required at the engine output shaft at the existing engine speed so as to permit transmission gear changes without engine stall.

SUMMARY OF THE INVENTION

There is provided, in accordance with the present invention, a method of controlling an internal combustion engine having an induction passage leading to at least one cylinder for generating a torque on its output shaft. The method including generating a first signal indicative of the speed of the engine output shaft and generating a second signal indicative of a selected engine operating parameter such for example as induction passage air flow or intake manifold absolute pressure. A first value for the rate of air flow introduced into the engine cylinder is calculated based upon the first and second signals. A second value for the amount of fuel delivered into the engine cylinder is calculated based upon the first value, the second value being substantially in direct proportion to the first value. A basic value of the timing of ignition in the engine cylinder is calculated based upon at least one of the first and second signals. An output-torque correction-factor is calculated based upon at least one of the first and second signals, the correction factor being substantially in direct proportion to a difference between the actual torque actually produced on the engine output shaft and the ideal torque required on the engine output shaft at the existing engine speed. The calculated ignition timing basic value is modified based upon the calculated output-torque correction-factor to provide a value for the timing of ignition in the engine cylinder.

In another aspect, the present invention provides an engine control apparatus for controlling an internal combustion engine having an induction passage leading to at least one cylinder for generating a torque on its output shaft. The apparatus comprises a first signal source for generating a first signal indicative of the speed of said engine output shaft, a second signal source for generating a second signal indicative of a selected engine operating parameter, and a control circuit for bringing the actual torque actually produced on the engine output shaft close to the ideal torque required on the engine output shaft at the existing engine speed. The control circuit responds to the first and second signals for calculating a first value for the rate of air flow introduced into the engine cylinder. The control circuit includes means for calculating a second value for the amount of fuel delivered to the engine cylinder based upon the first value, the second value being substantially in direct proportion to the first value. The control circuit includes means responsive to at least one of the first and second signals for calculating a basic value for the timing of ignition in the engine cylinder. The control circuit includes means responsive to at least one of the first and second signals for calculating an output-torque correction-factor, the output-torque correction-factor being substantially in direct proportion to a difference between the actual torque and the ideal torque. The control circuit includes means for modifying the calculated ignition timing basic value based upon the calculated output-torque correction-factor to provide a value for the timing of ignition in the engine cylinder.

BRIEF DESCRIPTION OF THE DRAWINGS

This invention will be described in greater detail by reference to the following description taken in connection with the accompanying drawings, in which:

FIGS. 12(A)–(F) contain curves useful in understanding of the operation of the prior art engine control apparatus;

FIGS. 13(A)–(F) contain curves useful in understanding of the principles of the present invention;

DETAILED DESCRIPTION OF THE PREFERRED EMBODIMENTS

Prior to the description of the preferred embodiments of the present invention, the prior art engine control apparatus is briefly described with reference to FIGS. 1 to 12 in order to specifically point out the difficulties attendant thereon.

Figure 1:
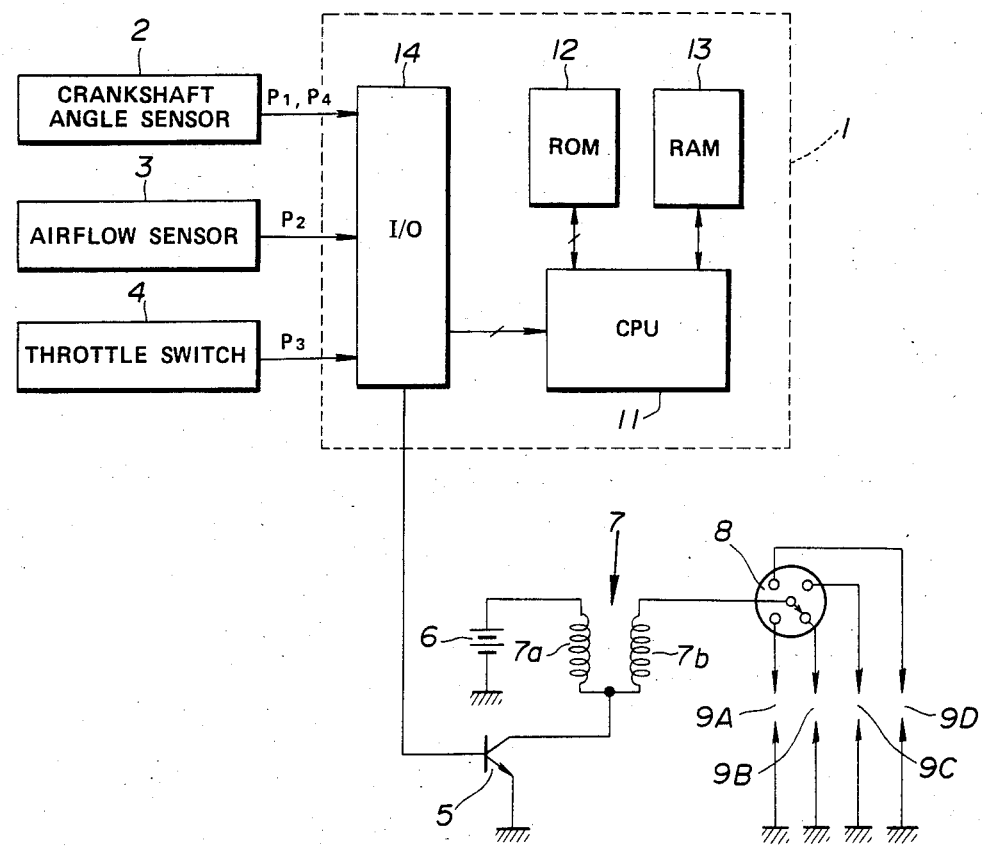
FIG. 1 is a block diagram showing a prior art ignition spark timing control apparatus.

FIG. 1 is a block diagram of a prior art engine control apparatus as it is used to control the timing of ignition spark events of an internal combustion engine. In FIG. 1, the reference numeral 1 designates a digital computer which includes a central processing unit (CPU) 11, a read only memory (ROM) 12, a read/write memory (RAM) 13, and an input/output control unit (I/O) 14. The CPU 11 communicates with the rest of the system through data bus.

Figure 2:
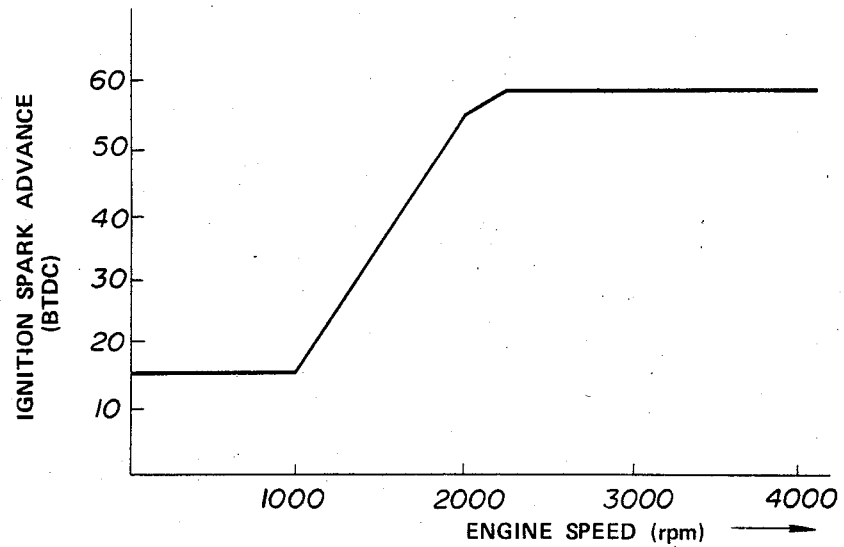
FIGS. 2 and 3 are representations of the loci of the predetermined ignition timing angles produced by the read only memory circuit element.
Figure 3:
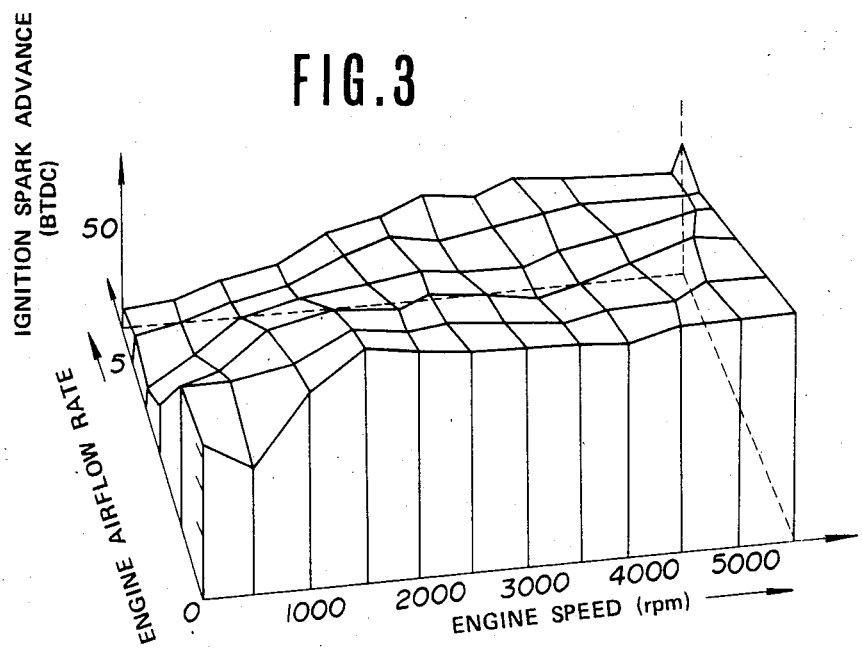

The ROM 12 contains the program for operating the CPU 11 and further contains appropriate engine control data in look-up tables. The look-up tables include a function table, which identifies, as a function of engine speed, an appropriate value for the timing of ignition spark events of the engine, as shown in FIG. 2, and a function table Y which identifies, as a function of engine speed and intake air flow rate, an appropriate value for the timing of ignition spark events of the engine, as shown in FIG. 3.

The digital computer input/output control unit 14 has inputs from various sensors including a crankshaft angle sensor 2, an airflow sensor 3, and a throttle switch 4. The crankshaft angle sensor 2 generates crankshaft position pulses P1 each corresponding to one degree of rotation of the engine crankshaft, of a repetition rate directly proportional to engine speed and a reference pulse P4 at a predetermined number of degrees before the top dead center position of the engine piston. The airflow sensor 3 generates a signal P2 indicative of the rate of air flow to the engine. The throttle switch 4 generates a signal P3 which changes to a high or logic 1 level when the throttle valve is at or near its closed position. The CPU 11 calculates the existing engine speed based upon the crankshaft position pulses P1 supplied from the crankshaft angle sensor 2 and the existing rate of air flow through the engine intake duct based upon the sensor P2 fed from the airflow sensor 3.

The CPU 11 selects the function table X (FIG. 2) and calculates an appropriate value for the timing of ignition spark events of the engine from the function table X upon the occurrence of a high level throttle switch sensor signal P3, that is, when the throttle valve is at or near its closed position. Otherwise, the CPU 11 selects the function table Y (FIG. 3) and calculates an appropriate ignition timing value from the function table Y.

The input/output control circuit 14 generates a timing adjustment signal which corresponds to the appropriate ignition timing value calculated by the CPU 11. The timing adjustment signal is coupled to a switching transistor 5 connected with the primary winding 7a of an ignition coil 7. The secondary winding 7b of the ignition coil 7 is connected too the rotor contact of a distributor generally designated as 8 which sequentially connects contacts on the distributor cap to respective spark plugs 9A, 9B, 9C and 9D. The primary winding 7a of the ignition coil is connected to the positive side of the vehicle battery 6. The transistor 5 is switched on and off to cause spark firing energy to be developed to fire the spark plugs of the engine. The transistor 5 is turned on and off at appropriate times corresponding to the ignition timing value calculated by the CPU 11.

Figure 4:
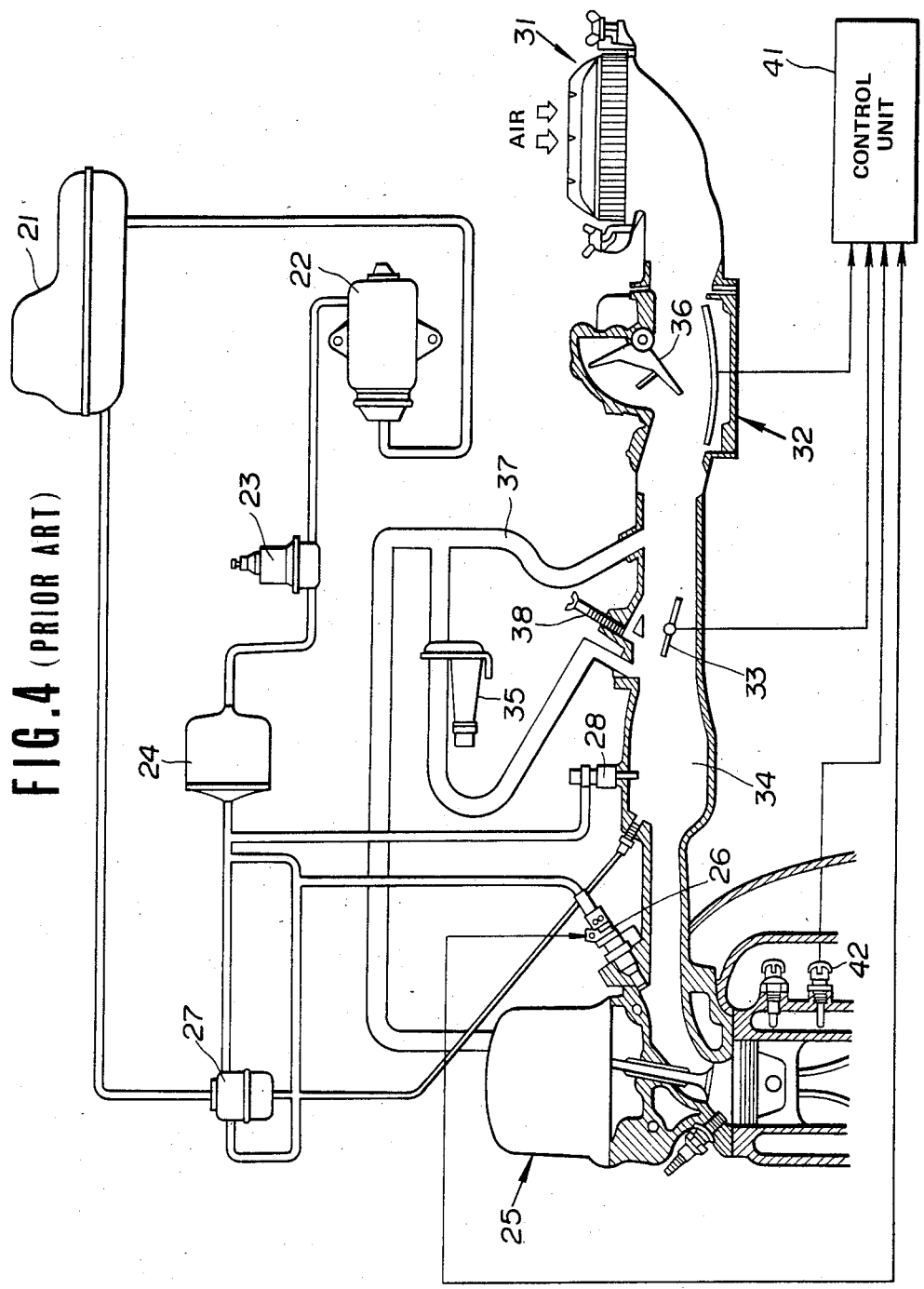
FIG. 4 is a schematic diagram showing a prior art fuel injection control apparatus.

FIG. 4 is a schematic diagram of a prior art engine control apparatus as it is used to control the timing and quantity of injection of fuel into the engine.

Fuel for the engine 25 is delivered by a fuel pump 22 from a fuel tank 21 through a fuel filter 24 to individual fuel injectors 26 for each of the cylinders of the engine 25, only one fuel injector being shown as opening toward the associated intake valve. A fuel pulsation damper 23 is provided between the fuel pump 22 and the fuel filter 34 for damping or suppressing fuel pulsations produced by the fuel pump 22. The pressure of fuel to the fuel injectors 26 is regulated at a constant value by a pressure regulator 27. The fuel injectors 26 may be of any suitable type so that fuel is metered by controlling the injection duration from each injector for the individual combustion chambers as controlled by an electric fuel injection control unit 41 as a function of engine operating conditions in a manner to be described later. The reference numeral 28 designates a cold-start fuel-injector which opens at low engine temperatures to furnish an extra charge of fuel so as to enrich the mixture for starting a cold engine.

Air to the engine 25 is supplied through an air filter 31 and the induction passage in an air flow meter unit, generally designated as 22, and through the throttle controlled air induction unit to an intake manifold 34 of the engine. The air flow meter unit contains an airflow meter 36 which measures the actual air flow to the engine. The air induction unit has therein a throttle valve 33 which is drivingly connected to an accelerator pedal for controlling the flow of air into the intake manifold 34 of the engine. A throttle switch, which is provided near the throttle valve, closes to generate a signal indicating idle conditions upon closure of the throttle valve 26. The reference numeral 37 designates a bypass passage through which air is supplied into the intake manifold 34 of the engine at idle conditions where the throttle valve 26 is at its closed position. The flow of air through the bypass passage 37 is controlled by the position of an idle adjuster screw 38. An air regulator 35 is also provided which controls the flow of air into the intake manifold 34 when the engine is starting or being warmed.

The fuel injection control unit 41 controls the air-fuel ratio to the engine by measuring the actual engine air flow and proportioning the fuel to the air flow. The fuel is metered by controlling the duration of injection from each injector at the individual engine cylinders. The air flow is measured by means of the airflow meter 36. The total air flow is used to determine the air flow per cycle by taking into account the engine speed and the number of cylinders of the engine. The engine speed in terms of the engine crankshaft speed is sensed by an engine speed and timing transducer (not shown) to provide a signal of engine speed and a basic synchronization signal for the fuel injection as a function of the engine operating cycle. The desired air-fuel ratio is modified as a function of engine temperature, engine speed, battery voltage, and/or the lapse of time after the engine starter is turned on. The fuel injection control unit 41 receives a signal from the engine starter, a signal indicative of engine temperature from an engine coolant temperature sensor 42, a signal indicative of engine air flow from the airflow meter 36, a signal indicative of engine speed from the engine speed and timing transducer, a signal from the throttle switch, and a signal indicative of battery voltage.

The amount of fuel metered to each cylinder, this being determine by the width of the electrical pulses applied to the fuel injectors, is repetitively determined by the fuel injection control unit 41. The fuel-injection pulse-width Tp is calculated as a function of engine air flow Q and engine speed N as $T = K \times Q/N$ wherein $K$ is a constant, and modified based upon various correction factors Ts, Tt, KAs and KAi.

Figure 5:
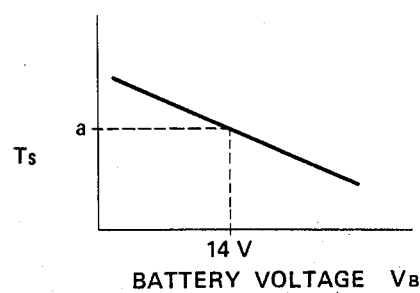
FIGS. 5 through 11 are graphs showing fuel delivery requirement correction factors used in calculating appropriate fuel-injection pulse-width values.

The correction factor Ts, which is used to compensate for variation of voltage of the battery as shown in FIG. 5, is given by $$Ts = a + b(14 + VB)$$

wherein a and b are constants and VB is the voltage of the battery by which the fuel injectors are driven.

Figure 6:
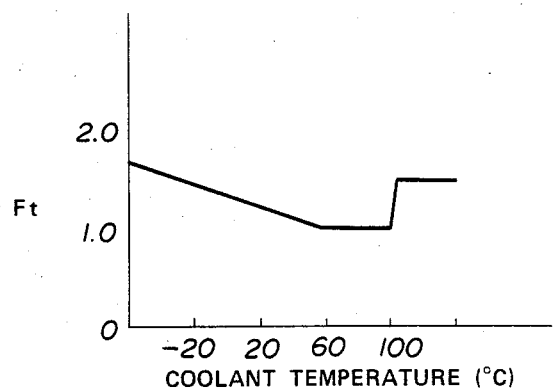

The coolant-temperature correction factor Ft, which is used when the engine is not warmed sufficiently, is obtained from the characteristic curve of FIG. 6.

Figure 7:
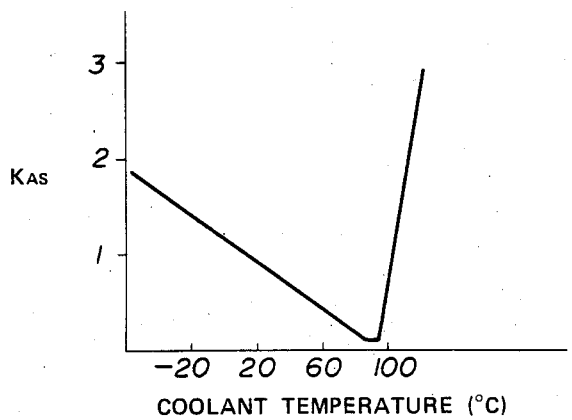
Figure 8:
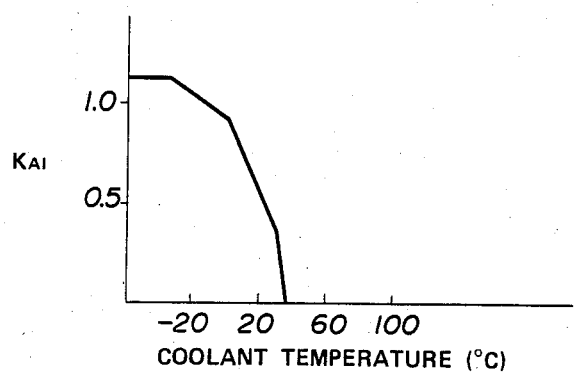

The correction factor KAs, which is used to supply additional fuel so as to provide smooth engine start and smooth transition to an idle condition, decreases to zero with the lapse of time. The correction factor KAs is at a variable initial value KAso when the engine starter is turned on. The initial value KAso varies as a function of coolant temperature as shown in FIG. 7.

The correction factor KAi, which is used to furnish additional fuel so as to provide smooth engine start when the engine is not warmed sufficiently, decreases to zero with the lapse of time. The correction factor KAi is at a variable initial value KAio when the throttle switch opens. The initial value KAio varies as a function of coolant temperature as shown in FIG. 6. The fuel-injection pulse-width Tp may be modified based upon the output of an exhaust gas sensor located in the exhaust passage from the engine.

Figure 9:
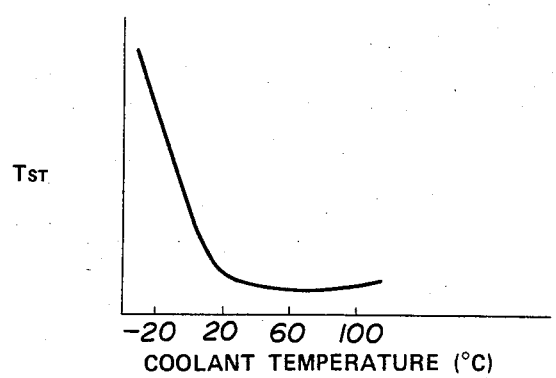
Figure 10:
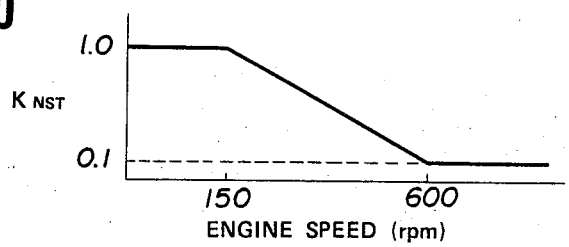
Figure 11:
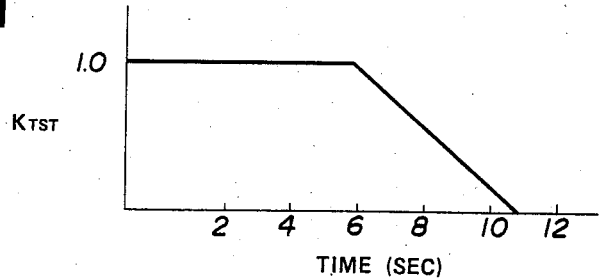

When the engine is starting, the fuel-injection pulse-width Tp is determined by the choice of greater one of
$T1 = K \times Q/N \times (1 + KAs) \times 1.3 + Ts$ and
$T2 = TST \times KNST \times KTST$, wherein TST varies as a function of cylinder-head coolant-temperature as shown in FIG. 9, KNST varies as a function of engine speed as shown in FIG. 10, and KTST varies with the lapse of time after the engine starter is turned on as shown in FIG. 11.

The operation of such a conventional engine control apparatus of the so-called L-Jetro type will be understood with reference to FIG. 12 which illustrates changes in induction passage air flow Q, engine cylinder air flow rate Qa, fuel-injection pulse-width Tp, air-fuel ratio Y, and engine output torque T upon a stepped change of the engine speed N at idle operation.

At idle operation when the throttle valve is at or near its closed position, the flow through the induction passage is sonic and the air flow Q introduced into the induction passage remains constant, as shown in FIG. 12B, regardless of engine speed changes, whereas the air flow rate Qa to the engine cylinder changes with a time lag of first order relative to an engine speed change due to the influence of induction passage volume and the cylinder stroke volume, as shown in FIG. 12C. Upon a stepped decrease of the engine speed N from 700 rpm to 600 rpm, as shown in FIG. 12A, at idle operation, the air-flow ratio Y of the mixture in the engine cylinder will be enriched in a stepped manner and then leaned gradually to the value at which the air-fuel ratio is controlled, as shown in FIG. 12E, since the amount Tp of fuel to the engine cylinder, which is represented as $Tp = K \times Q/N$ and in direct proportion to the reciprocal of the engine speed N, increases in a stepped manner, as shown in FIG. 12D, whereas the rate Qa of air flow actually introduced into the engine cylinder increases with a time lag of first order relative to the engine speed change. Furthermore, this engine speed change will cause a change of the torque T produced actually on the engine output shaft with a time lag relative to the engine speed change due to the time lag of first order produced when the air flow rate Qa to the engine cylinder changes with the engine speed change. The engine output torque T changes in different patterns, as shown by the solid, broken, and dot-dash curves of FIG. 12F, depending upon the value at which the air-fuel ratio is controlled. The solid curve indicates engine output torque variations when the air-fuel ratio is controlled on the rich side. The broken curve indicates engine output torque variations when the air-fuel ratio is controlled at the stoichiometric value. The dot-dash curve indicates engine output torque variations when the air-fuel ratio is controlled on the lean side.

The principles of the engine control apparatus of the present invention will be described with reference to FIG. 13 which illustrates changes in induction passage air flow Q, engine cylinder air flow rate Qa, fuel supply Tp, air-fuel ratio Y, and engine output torque T upon a stepped change of the engine speed N at idle operation.

According to this invention, the amount Tp of fuel delivered to the engine cylinder is controlled in direct proportion to the rate Qa of air flow introduced into the engine cylinder rather than the air flow introduced into the induction passage. Consequently, the amount Tp of fuel to the engine varies gradually, as shown in FIG. 13D, upon a stepped change of the engine speed N from 700 rpm to 600 rpm, as shown in FIG. 13A. As a result, the patterns of change of the engine output torque T come close to substantially the same figure, as shown in FIG. 13E, regardless of the value at which the air-fuel ratio is controlled. In FIG. 13E, the solid curve indicates engine output torque variations when the air-fuel ratio is controlled on the rich side, the broken curve indicates engine output torque variations when the air-fuel ratio is controlled at the stoichiometric value, the dot-dash curve indicates engine output torque variations when the air-fuel ratio is controlled on the lean side, and the two-dotted curve indicates an ideal pattern of change of the engine output torque T with no time lag relative to the change of the engine speed N. It can be seen from FIG. 13E, however, tht the engine output torque T changes with some time lag relative to the change of the engine speed N due to the time lag of first order produced when the air flow rate Qa to the engine cylinder changes with a change in engine speed N. FIG. 13F illustrates variations of an output-torque correction-factor $\Delta T$ which is the difference $T1-T2$ resulting from subtracting the ideal torque T1, which is required to appear on the engine output shaft at the existing engine speed as illustrated by the two-dotted curve of FIG. 13E, from the actual torque T, which is produced actually on the engine output torque as illustrated by the solid, broken or dot-dash curve of FIG. 13E.

Figure 14:
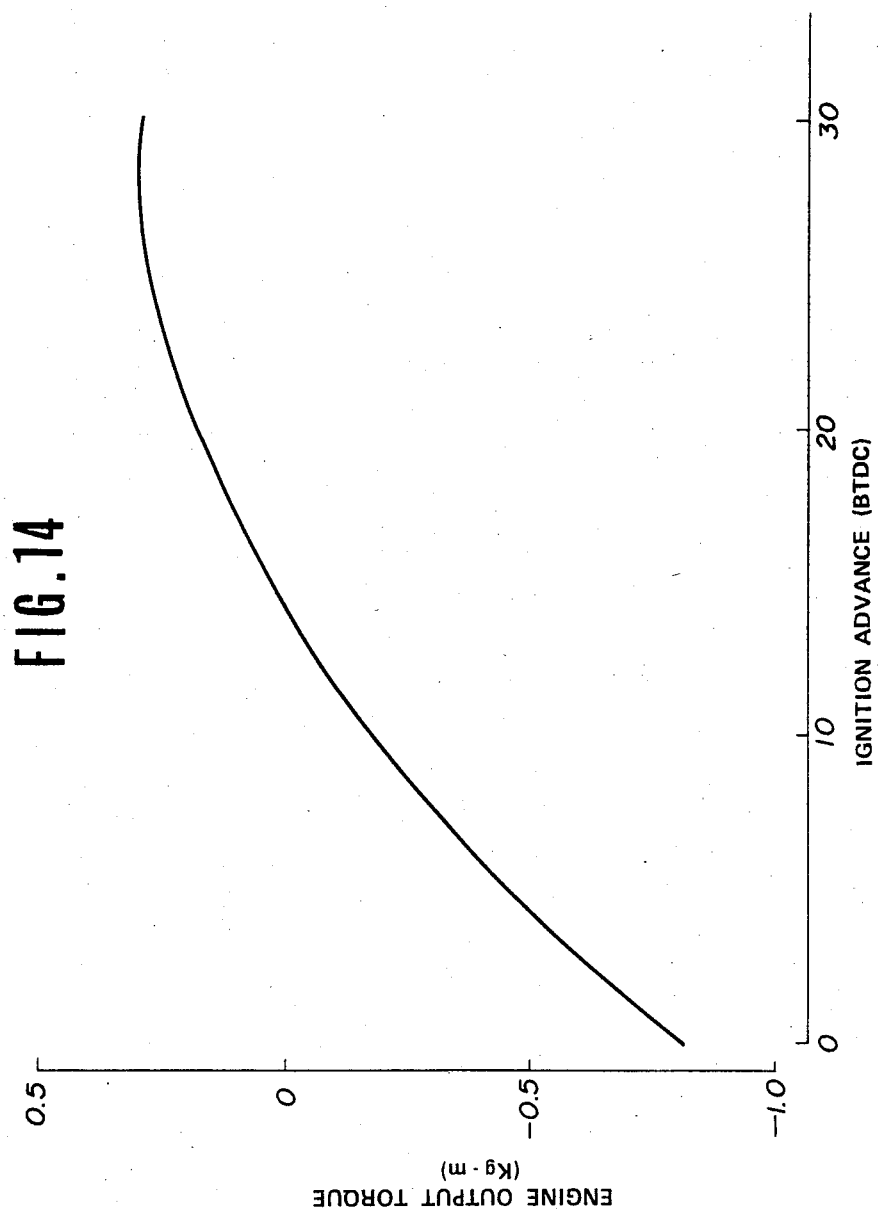
FIG. 14 is a graph of ignition spark advance versus engine output torque.

In view of the fact that the engine output torque T varies as a function of ignition timing in terms of ignition spark advance, as shown in FIG. 14, the present invention controls the ignition timing in a manner to bring the actual engine output torque T quite close to the ideal engine output torque T1 while controlling the amount of fuel delivered to the engine in direct proportion to the engine cylinder air flow rate Qa.

Figure 15:
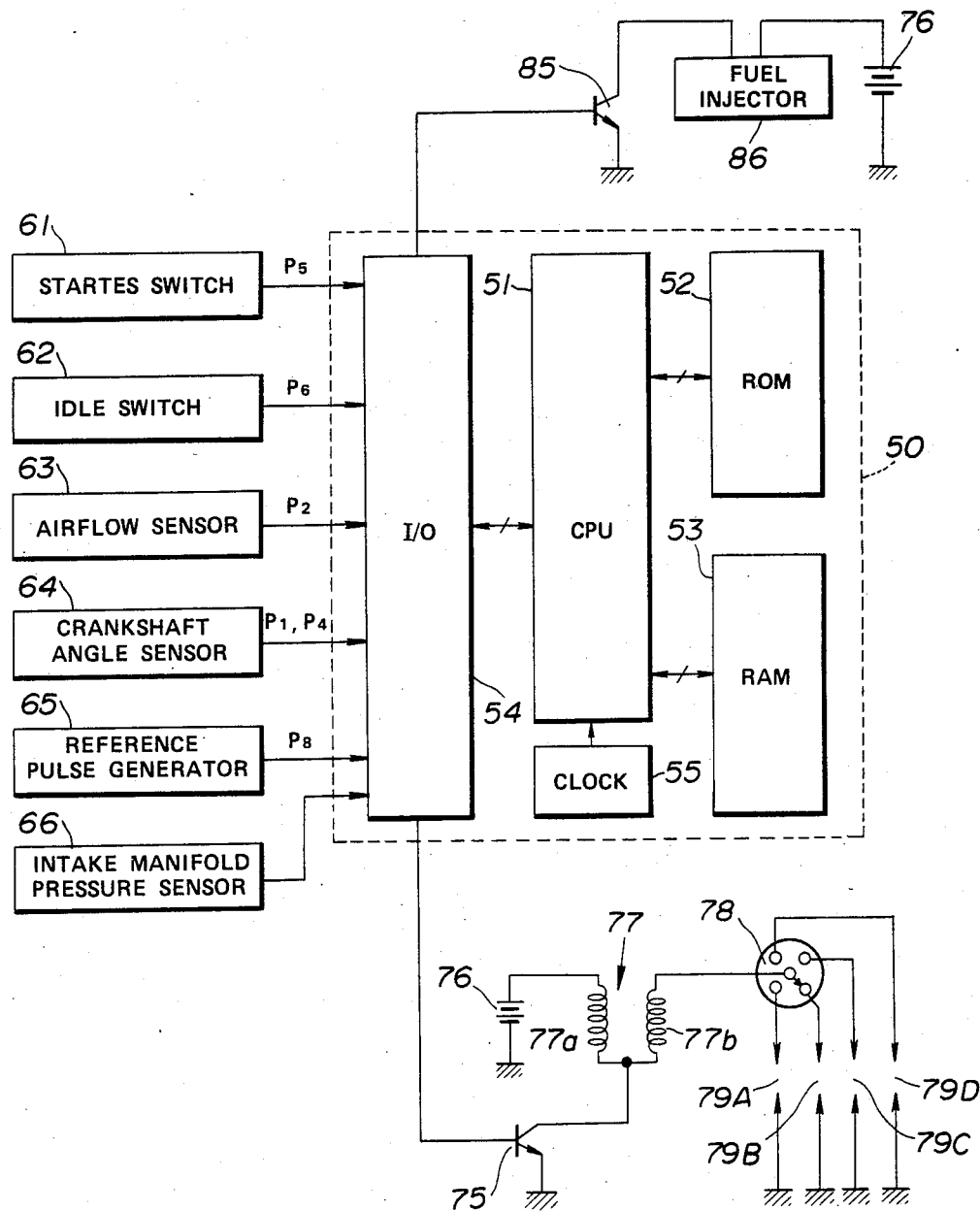
FIG. 15 is a block diagram showing one embodiment of an engine control apparatus made in accordance with this invention.

FIG. 15 is a block diagram showing one embodiment of an engine control apparatus made in accordance with the principles of the present invention. The engine control apparatus includes a general purpose digital computer capable of performing the arithmetic calculations of addition, subtraction, multiplication, and division on binary numbers. The digital computer comprises a central processing unit (CPU) 51 in which the actual calculations are performed, a read only memory (ROM) 52, a read/write memory (RAM) 53, an input/output control unit (I/O) 54, and a clock pulse generator 55 which generates clock pulses at a constant repetition rate. The CPU 51 communicates with the rest of the system through a data bus.

The ROM 52 contains the program for operating the CPU 11 and further contains appropriate engine control data in look-up tables for use in calculating the amount of fuel metered to the engine and the timing of ignition of the engine. The look-up table data may be obtained experimentally or derived empirically. The amount of fuel metered to the engine, this being determined by the width Tp of the electrical pulses applied to the fuel injectors, and ignition timing are repetitively determined from calculations performed by the digital computer, these calculations being based upon various conditions of the engine that are sensed during its operation. These sensed conditions may include cylinder-head coolant temperature, ambient temperature, throttle position, engine load, and engine speed.

The digital computer input/output control unit 54 has inputs from various signal sources which include but are not necessarily limited to a starter switch 61, an idle switch 62, an airflow sensor 63, a crankshaft angle sensor 64, and a reference pulse generator 65. A manifold pressure sensor 66 may be substituted for the airflow sensor 63. The crankshaft angle sensor 64 generates crankshaft position pulses P1 each corresponding to one degree of rotation of the engine crankshaft, of a repetition rate directly proportional to engine speed and a crankshaft reference pulse P4 at a predetermined engine crankshaft angle relative to piston top dead center. The airflow sensor 63 senses the induction passage air flow Q, that is, the amount of air introduced into the induction passage, and generates a signal P2 indicative of the sensed induction passage air flow. The starter switch 61 generates an "on" signal p5 when the starter switch 61 is turned on during engine starting. The idle switch 62 generates an "on" signal when the idle switch is turned on at idle conditions. The idle switch 62 may be removed and replaced by a throttle switch which generates an "on" signal when the throttle valve is at or near its closed position at idle conditions. The reference pulse generator 65 generates a reference pulse signal P8 coincident with one rotation of engine crankshaft. The intake manifold pressure sensor 66 senses the absolute pressure within the engine intake manifold and generates a signal P7 indicative of the intake manifold absolute pressure.

The digital computer input/output control unit 54 includes an analog multiplexer and an analog-to-digital converter which converts analog signals including the signals P2 and P7 applied to the analog multiplexer, one by one, into digital form for application to the CPU 51. The digital computer input/output control unit 54 includes a counter which counts the crankshaft position pulses P1 from the crankshaft angle sensor 64 for a predetermined time interval, for example, of 12.5 microseconds. The digital computer input/output control unit 54 also includes an ignition timing logic circuit which generates an ignition timing adjustment signal so as to set the time at which ignition occurs in the engine cylinder, according to the calculated value for the same. Similarly, the digital computer input/output control unit 54 includes a fuel injection control logic circuit which generates a fuel injection control signal so as to set the length of the width of the electrical pulse applied to the fuel injector and, thus, determine the amount of fuel injected through the fuel injector into the intake manifold, according to the calculated value for the same.

Figure 16:
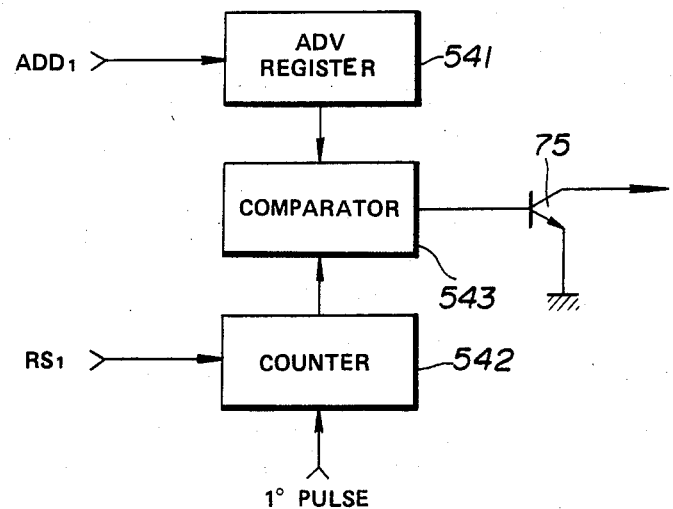
FIG. 16 is a block diagram showing the spark ignition timing logic circuit used in the apparatus of FIG. 15.

Referring to FIG. 16, the ignition timing logic circuit includes an ADV register 541, a counter 542, and a comparator 543. The CPU 51 transfers the calculated value (ADD1) for ignition timing into the ADV register 541. The counter 542 is reset and it starts counting crankshaft position pulses P1 in response to a reset pulse RS1 (crankshaft reference pulse P4). The comparator 543 generates an ignition timing adjustment signal which changes to a high or logic 1 level when the counter 542 is reset and to a low or logic 0 level when the count of the counter 542 reaches the value set in the ADV registor 541. The ignition timing adjustment signal is applied to a switching transistor 75 connected with the primary winding 77a of an ignition coil 77 (FIG. 15). The secondary winding 77b of the ignition coil 77 is connected to the rotor contact of a distributor generally designated as 78 which sequentially connects contacts on the distributor cap to respective spark plugs 79A, 79B, 79C and 79D. The primary winding 77a of the ignition coil is connected to the positive side of the vehicle battery 76. The transistor 75 is switched on and off to cause spark firing energy to be developed to fire the spark plugs of the engine. The transistor 75 is turned on in response to a change of the timing adjustment signal to the high or logic 1 level and is turned off in response to a change of the ignition timing adjustment signal to the low or logic 0 level.

Figure 17:
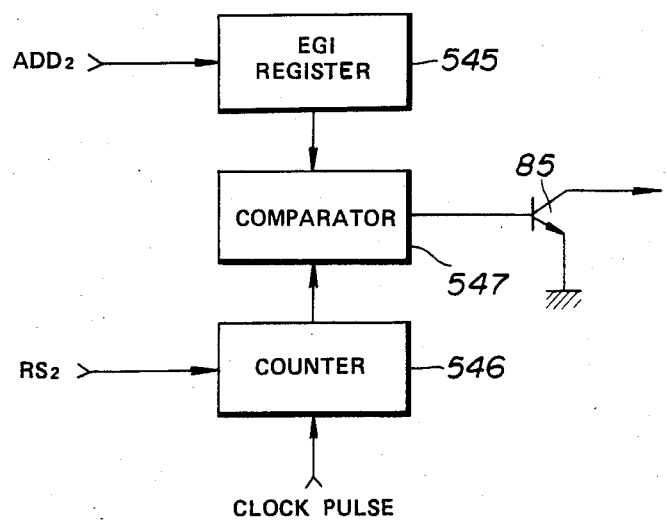
FIG. 17 is a spark diagram showing the fuel injection control logic circuit used in the apparatus of FIG. 15.

Referring to FIG. 17, the fuel injection control logic circuit includes an EGI register 545, a counter 546, and a comparator 547. The CPU 51 transfers the calculated value (ADD2) for the width of electrical pulses applied to the fuel injectors 86 which determines the amount of fuel metered to the engine, into the EGI register 545. The counter 546 is reset and it starts counting clock pulses in response to a reset pulse RS2 (reference pulse P8). The comparator 547 generates a fuel injection control signal having a pulse width corresponding to the calculated value which changes to a high or logic 1 level when the counter 546 is reset and to a low or logic 0 level when the count of the counter 546 reaches the value (ADD2) set in the EGI register 545. The fuel injection control signal, which has a pulse width corresponding to the calculated value (ADD2), is applied to a switching transistor 85 connected to an individual injector 86 (FIG. 15). The transistor 85 is switched on and off to cause the fuel injector 86 to inject fuel into the associated engine cylinder for a time interval corresponding to the calculated value (ADD2). The transistor 85 is turned on in response to a change of the fuel injection control signal to the high or logic 1 level and is turned off in response to a change of the fuel injection control signal to the low or logic 0 level.

The digital computer central processing unit 51 calculates an appropriate value for the timing of ignition of the engine and also an appropriate value for the amount of fuel to the engine cylinder as follows:

During idle engine operation where the throttle valve is at or near its closed position so that the flow through the induction passage is sonic, a fairly good approximation of the actual air flow rate Qa2 to the engine cylinder is provided as a function of engine speed N and induction passage air flow Q and is expressed as:

$$Qa2 = (1-\alpha)Qa2' + \alpha \times 2Q/CN \qquad (1)$$

where Qa2' is the engine cylinder air flow rate measured during the last cycle of strokes of the piston, C is the number of cylinders of the engine, α is a constant represented as $\alpha = \eta \times v/V$ where η is the volumetric efficiency, v is the cylinder stroke volume, and V is the induction passage volume.

In order to retain the air-fuel ratio substantially at a constant so as to provide substantially the same figure of change of the engine output torque T regardless of the value at which the air-fuel ratio is controlled, as illustrated in FIG. 13E, upon a change of the engine speed N, the digital computer measures the existing values of engine speed N and induction passage air flow Q, estimates the actual value of engine cylinder air flow rate Qa2 in accordance with equation (1), and supplies fuel to the engine cylinder in an amount directly proportional to the actual engine cylinder air flow rate Qa2.

Furthermore, an ideal value Qa1 of engine cylinder air flow rate, that is, the rate of air flow required to enter the engine cylinder without any time lag relative to a change of the engine speed N, may be calculated as a function of engine speed N and induction passage air flow Q and is expressed as:

$$Qa1 = 2Q/CN \qquad (2)$$

In view of the fact that the engine output torque T will be in direct proportional to the engine cylinder air flow rate Qa if the amount of fuel to the engine is controlled in a manner to retain the air-fuel ratio substantially at a constant, the output-torque correction-factor ΔT, that is, the difference between the ideal and actual engine output torque values may be considered as being in direct proportion to the difference between the ideal and actual engine cylinder air flow rate values Qa1 and Qa2 and expressed as:

$$\Delta T \propto Qa1 - Qa2 \qquad (3)$$

In order to control the timing of ignition of the engine in a manner to compensate for the time lag of change of the engine output torque resulting from the time lag of change of the engine cylinder air flow rate relative to a change of the engine speed N, the digital computer calculates a difference between the ideal and actual values Qa1 and Qa2 of engine cylinder air flow rate, calculates an ignition-timing correction-factor based upon the calculated difference, and modifies the timing of ignition of the engine by the calculated ignition-timing correction-factor.

Figure 18:
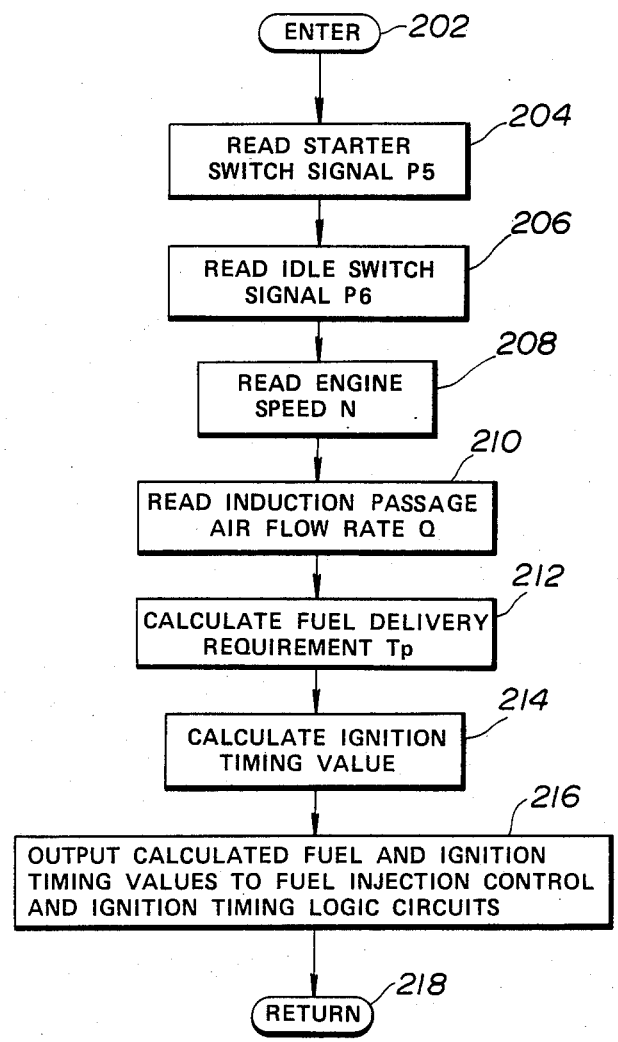
FIGS. 18, 19, 20, 21(A)–(D), 22, 23 and 24 are flow diagrams showing the programming of the digital computer used in the apparatus of FIG. 15.

FIG. 18 is an overall flow diagram of the programming of the digital computer. The computer program is entered at the point 202. At the point 204 in the program, the digital computer reads the starter switch signal P5 fed from the starter switch 61 into the RAM 53 at a specified address D1. At the point 206, the idle switch signal P6 applied from the idle switch 62 is read into the RAM 53 at a specified address D2. Sequentially, at the point 208, the engine speed N is read into the RAM 53 at a specified address DN. For this purpose, the digital computer reads the count of a counter which counts crankshaft position pulses P1 from the crankshaft angle sensor 64 for a predetermined time interval, for example, of 12.5 microseconds. Following this, the various inputs to the analog multiplexer are, one by one, converted by the analog-to-digital converter into digital form and read into the RAM 53 via the data bus. Thus, at the point 210 in the program, the induction passage air flow Q is converted into digital form and read into the RAM 53 at a specified address DQ.

At the point 212, the fuel delivery requirement, in the form of fuel-injection pulse-width Tp, is calculated by the digital computer from an algebraic relationship programmed into the digital computer as described later in greater detail. At the point 214 in the program, the required ignition timing, in the form of ignition spark advance, is calculated by the digital computer from an algebraic relationship programmed into the digital computer as described later in greater detail. At the point 216 in the program, the calculated values for the ignition timing and the fuel-injection pulse-width Tp are transferred to, respectively, the ignition timing logic circuit ADV register 541 and the fuel injection control logic circuit eGI register 545.

Figure 19:
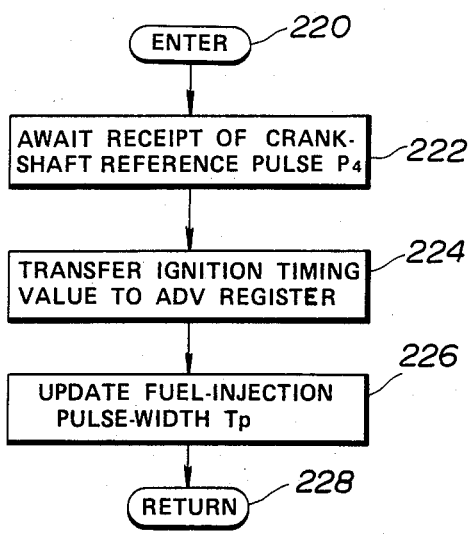

FIG. 19 is a flow diagram of the programming of an interrupt routine performed by the digital computer. The computer program is entered at the point 220. At the point 222 in the program, the digital computer awaits the receipt of a crankshaft reference pulse P4 which is generated from the crankshaft angle sensor 64 for each cycle of strokes of the engine piston. After the receipt of this crankshaft reference pulse, at the point 224, the calculated ignition timing value is set in the ignition timing logic circuit ADV register 541. Following this, at the point 226, the fuel-injection pulse-width Tp is updated. At the point 228, the computer program returns to the entry point 220 to await receipt of the next crankshaft reference pulse P4.

Since the fuel-injection pulse-width Tp is in direct proportion to the actual engine cylinder air flow rate Qa2 and the fuel-injection pulse-width Tps calculated in the conventional manner as a function of engine speed N and induction passage air flow Q is in direct proportion to the ideal engine cylinder air flow rate Qa1, the operation of the engine control apparatus of the present invention will be described using the fuel-injection pulse-width Tp in place of the actual engine cylinder air flow rate Qa2 and the fuel-injection pulse-width TpS in place of the ideal engine cylinder air flow rate Qa1. That is, equations (1) and (2) may be rewritten as follows:

$$Tp = (1-\alpha) \times Tp' + \alpha \times K \times Q/N = K' \times Qa2 \quad (4)$$

$$TpS = K \times Q/N = K' \times Qa1 \quad (5)$$

wherein Tp' is the fuel-injection pulse-width Tp which is calculated during the last cycle of strokes of the engine piston.

Figure 20:
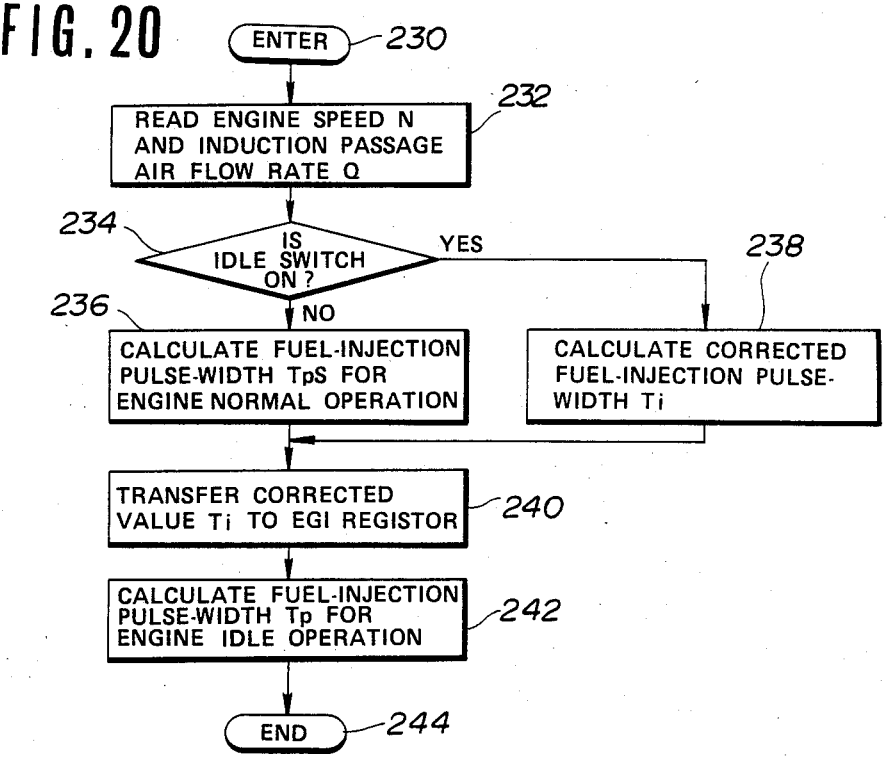

FIG. 20 is a flow diagram illustrating the above calculation of the fuel delivery requirement Tp. At the point 230 in FIG. 20, which corresponds to the point 212 of FIG. 18, the computer program is entered. At the point 232, the digital computer reads the engine speed N stored at the address DN of the RAM 53 and the induction passage air flow Q stored at the addredd DQ of the RAM 53. At the point 234, a determination is made as to whether or not the idle switch 62 is "on", that is, the engine is idling. For this purpose, the digital computer reads the idle switch signal stored at the address DI2 of the RAM 53. If the answer to this question is "no", then the program proceeds to the point 236 where the digital computer calculates the fuel-injection pulse-width Tp based upon the read values of the engine speed N and the induction passage air flow Q in the conventional manner as:

$$TP = TpS = K \times Q/N$$

where K is a constant.

If the answer to the question is "yes", then it means the engine is idling and the program proceeds to the point 238 where the fuel-injection pulse-width Tp for the engine being idling is calculated from the following equation based upon read values of the engine speed N, the induction passage air flow Q, and the fuel-injection pulse-width Tp' calculated in the last cycle of strokes of the engine piston:

$$Tp = (1-\alpha) \times Tp' + \alpha \times TpS$$

Alternatively, the fuel-injection pulse-width Tp for the engine being idling may be calculated as:

$$Tp = \frac{1}{n} \sum_{i=0}^{n-1} TpSi = K \times \frac{1}{n} \sum_{i=0}^{n-1} Qi/Ni$$

wherein TpS, Qi and Ni are the fuel-injection pulse-width TpS, the induction passage air flow Q, and the engine speed N calculated in the i-th cycle of ignition of the engine, respectively.

Following the calculation of the fuel-injection pulse-width Tp, the program preferably proceeds to the point 240, the calculated fuel-injection pulse-width Tp is modified for various sensed engine operating parameters as:

$$Ti = Tp \times (FT + KAS + KAI) + TS.$$

At the point 242 in the program, the corrected fuel-injection pulse-width Ti is transferred to the EGI register 545 of the fuel injection control logic circuit (FIG. 17).

Figure 21:
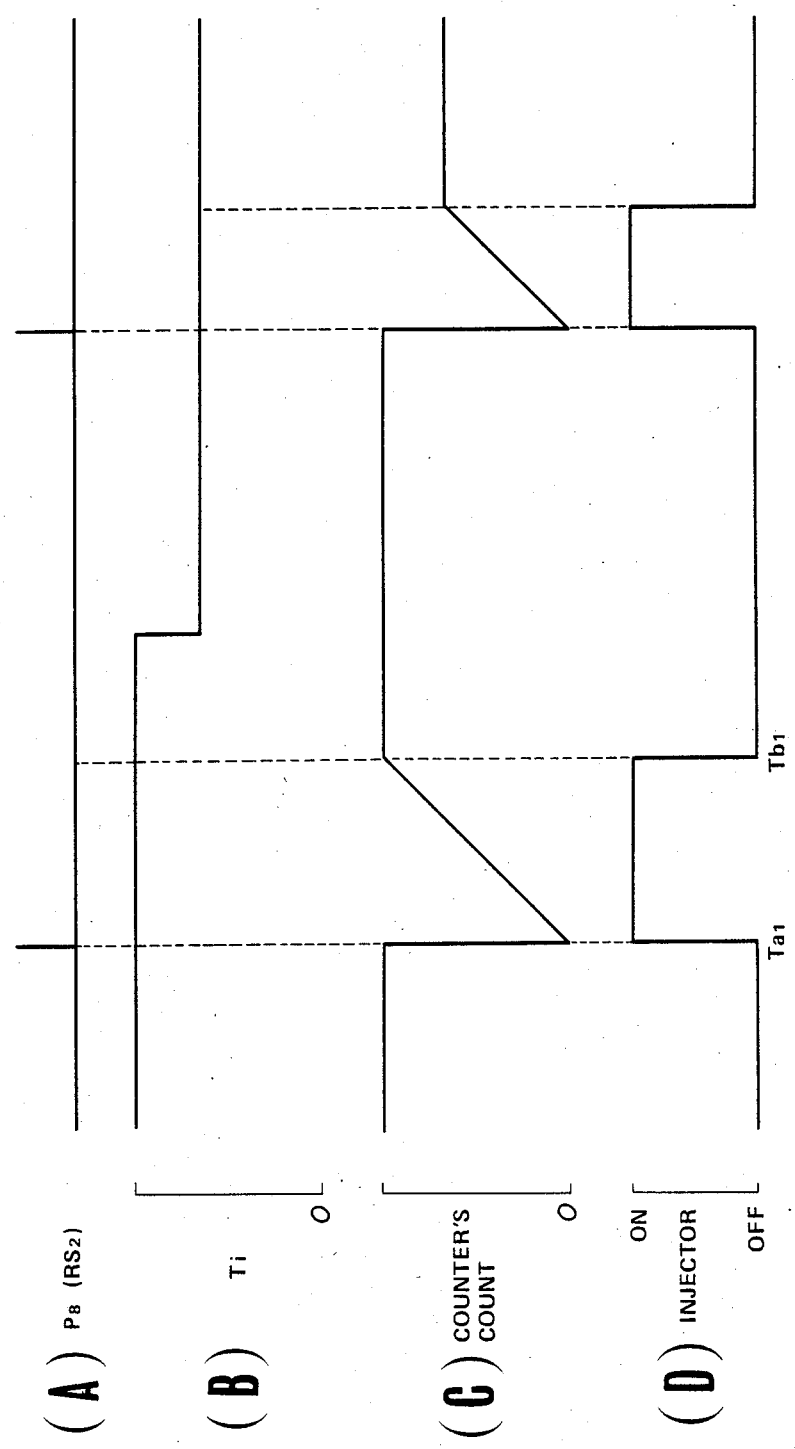

In the fuel injection control logic circuit, at time Ta1 when the counter 546 is reset by a reset pulse RS2, that is, a reference pulse P8 produced for each rotation of the engine crankshaft from the reference pulse generator 65, the comparator 547 turns the switching transistor 85 on, thereby initiating fuel injection, as shown in FIG. 21. At time Tb1 when the count of the counter 546 reaches the value set or loaded in the EGI register 545, the comparator 547 turns the switching transistor 85 off, thereby terminating the fuel injection, as shown in FIG. 21.

This fuel delivery control by which the engine is supplied with fuel in an amount directly proportional to the rate of air flow actually introduced into the engine cylinder can bring the patterns of change of the engine output torque close to the same figure.

Figure 22:
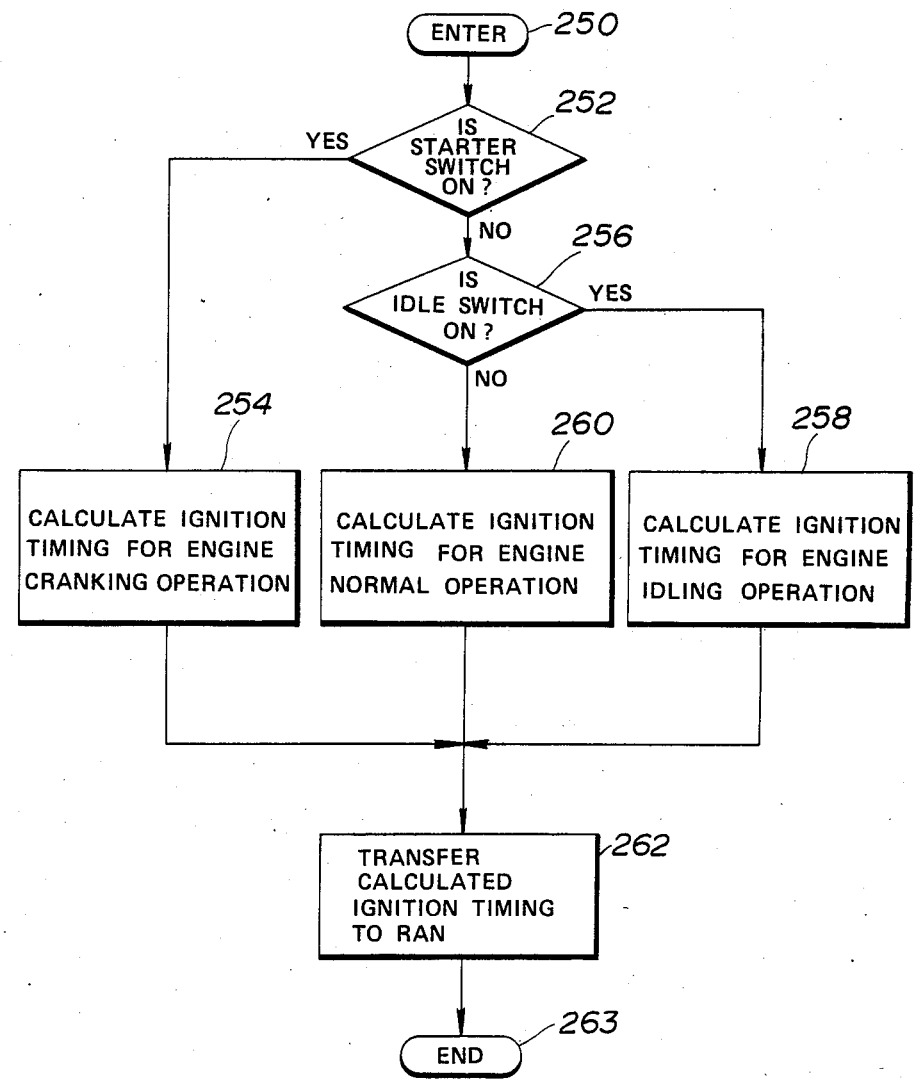

FIG. 22 is a flow diagram illustrating the above calculation of the timing of ignition of the engine. At the point 250 in FIG. 22, which corresponds to the point 214 of FIG. 18, the computer program is entered. At the point 252, a determination is made as to whether or not the starter switch 61 is "on". For this purpose, the digital computer reads the starter switch signal out of the address DI1 of the RAM 53. If the answer to this question is "yes", then it means that the engine is cranking and the program proceeds to the point 254 where the digital computer calculates an appropriate value for the ignition timing for the engine being cranking. Following this, the program proceeds to the point 262 where the calculated ignition timing value is stored at a specified address ADVL of the RAM 53.

Otherwise, the computer program proceeds to another determination point 256. This determination is as to whether or not the idle switch is "on". For this purpose, the digital computer reads the idle switch signal stored at the address DI2 of the RAM 53. If the answer to this question is "yes", then it means that the engine is idling and the program proceeds to the point 258 where the digital computer calculates a basic value A for the timing of ignition of the engine based upon the engine speed N and modifies the calculated ignition timing basic value A for a value corresponding to the output-torque correction-factor ΔT. For this purpose, the digital computer reads the engine speed value N out of the address DN of the RAM 53 and looks at the ignition timing basic value A on the function table stored in the RAM 53. This function table stores signals with values indicative of ignition spark advance as a function of engine speed for the engine being idling. Following this, the program proceeds to the point 262 where the modified value is stored at the address ADVL of the RAM 53.

If the idle switch 62 is not "on", then the program proceeds to the point 260 where the digital computer calculates an appropriate value for the timing of ignition of the engine based upon the engine speed N and the induction passage air flow Q by looking the function table stored in the RAM 53. This function table stores signals with values indicative of ignition spark advance as a function of engine load and engine speed for the engine being operating normally. For this purpose, the digital computer reads the engine speed N stored at the address DN of the RAM 53 and the induction passage air flow Q stored at the address DQ of the RAM 53. Following this, the program proceeds to the poiont 262 where the calculated value AD is stored at the address ADVL of the RAM 53.

The ignition timing value AD stored at the address ADVL of the RAM 53 is read, converted into a corresponding ignition timing value ADD1 during the interrupt routine of FIG. 19, and set in the ADV register 541 of the ignition timing logic circuit.

Figure 23:
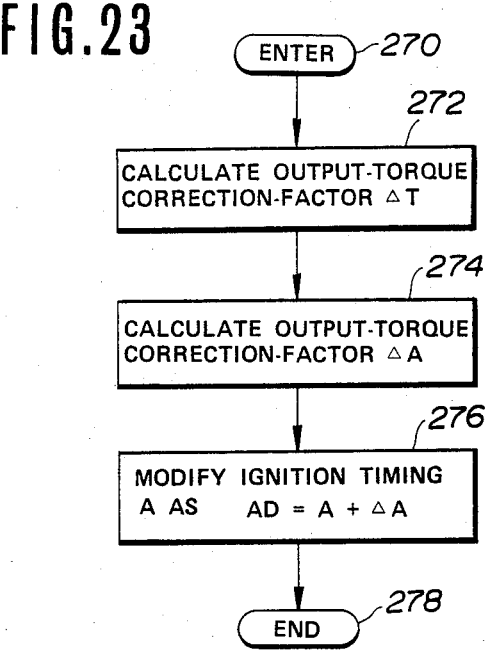

FIG. 23 is a flow diagram illustrating the above calculation of the timing of ignition of the engine for the engine being idling. At the point 270 in FIG. 23, which corresponds to the point 258 of FIG. 22, the computer program is entered. At the point 272 in the program, the digital computer calculates a output-torque correction-factor $\Delta T$ as described later in greater detail. The output-torque correction-factor $\Delta T$ is in direct proportion to the difference between the actual and ideal values of the engine cylinder air flow rate. At the point 274 in the program, the digital computer calculates the ignition-timing correction-factor $\Delta A$ as a function $f(\Delta T)$ of output-torque correction-factor $\Delta T$. At the following point 276, the digital computer modifies the calculated ignition timing basic value A for the calculated ignition-timing correction-factor A as:

$$AD = A + \Delta A$$

The calculated ignition timing value AD is stored at the address ADVL of the RAM 53 at the point 262 of FIG. 22.

Figure 24:
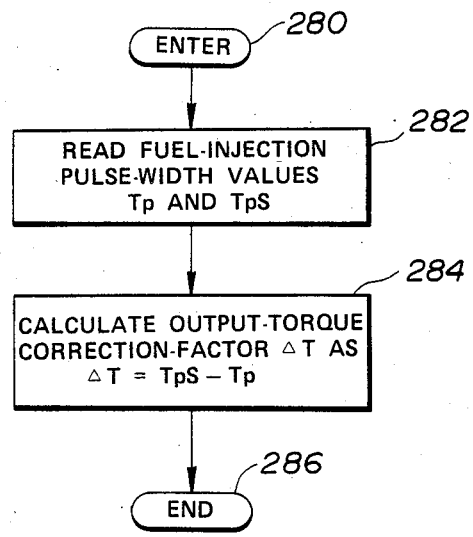

FIG. 24 is a flow diagram illustrating the above calculation of the output-torque correction-factor $\Delta T$. At the point 280 in FIG. 24, which corresponds to the point 272 of FIG. 23, the computer program is entered. At the point 282 in the program, the digital computer reads the fuel-injection pulse-width TpS calculated at the point 236 of FIG. 20 and the fuel-injection pulse-width Tp calculated at the point 238 of FIG. 20. The fuel-injection pulse-width TpS corresponds to the ideal engine output torque and the fuel-injection pulse-width Tp corresponds to the actual engine output torque, as described above. At the point 284 in the program, the digital computer calculates the output-torque correction-factor $\Delta T$, based upon the read values TpS and Tp, as:

$$\Delta T = TpS - Tp$$

For example, the function $f(\Delta T)$ may be such a function as to fulfill the condition, that is, $f(\Delta T) \geq 0$ when $\Delta T \geq \Delta T1$, $f(\Delta T) = 0$ when $\Delta T1 > \Delta T > \Delta T2$, and $f(\Delta T) \leq 0$ when $\Delta T \leq \Delta T2$, wherein $\Delta T1$ is a constant equal to or less than 0.

Although the output-torque correction-factor $\Delta T$ is calculated as $\Delta T = TpS - Tp$ at the step 284 of FIG. 24, it is to be noted that the output-torque correction-factor $\Delta T$ may be calculated as $\Delta T = TpS/Tp$, in which case, the constant $\Delta T1$ is set at a constant equal to and greater than 1.0 and $\Delta T2$ is set at a constant between 0 and 1.0. In addition, although the ignition timing value AD is calculated as $AD = A + \Delta A$ at the point 276 of FIG. 23, it is to be noted that the ignition timing value AD may be calculated as $AD = A \times \Delta A$, in which case, the function $f(\Delta T)$ may be such a function as to fulfill the condition, that is, $f(\Delta T) \geq 1.0$ when $\Delta T \geq \Delta T1$, $f(\Delta T) = 1.0$ when $\Delta T1 > T > \Delta T2$, and $0 \leq f(\Delta T) \leq 1.0$ when $\Delta T \leq \Delta T2$, where $\Delta T1$ is a constant equal to or greater than 0 when the output-torque correction-factor $\Delta T$ is calculated as $\Delta T = TpS - Tp$ or constant equal to or greater than 1.0 when it is calculated as $\Delta T = Tps/Tp$ and $\Delta T2$ is a constant equal to or less than 0 when the output-torque correction-factor $\Delta T$ is calculated as $\Delta T = Tps - Tp$ or a constant set between 0 and 1.0 when it is calculated as $\Delta T = Tps/Tp$.

Since the calculated ignition timing basic value is modified based upon an output-torque correction-factor, which corresponds to a difference between the fuel-injection pulse-width TpS calculated at engine normal operation and the fuel-injection pulse-width Tp calculated at engine idle operation, in a manner to bring the actual engine output torque quite close to the ideal engine output torque, the engine output torque can change with no time lag relative to an engine speed change, thereby permitting transmission gear changes without the occurrence of engine stall at idle operation.

The output-torque correction-factor $\Delta T$ may be calculated as a function of an alternative engine operating parameter. Since the flow through the induction passage is sonic and the induction passage air flow Q remains substantially constant at idle operation when the throttle valve is at or near its closed position, Equations (2) and (1) may be rewritten as:

$$Qa1 = K1 \times Q/N \tag{6}$$

$$Qa2 = (1-\alpha)Qa2' + \alpha \times K1 \times Q/N = (1-\alpha)Qa2' + \alpha \times Qa1 \tag{7}$$

where $\alpha$ is a constant and K1 is a constant given as $K1 = 2Q/C$.

Alternatively, the actual engine cylinder air flow rate Qa2 may be calculated as:

$$Qa2 = K \times \frac{1}{n} \sum_{i=0}^{n-1} Qi/Ni$$

where Qi and Ni are the inducation passage air flow Q and the engine speed N calculated in the i-th cycle of ignition of the engine, respectively.

In order to control the ignition timing in a manner to compensate for the time lag of change of the engine output torque resulting from the time lag of change of the engine cylinder air flow rate relative to a change of the engine speed N, the digital computer may calculate a difference between the ideal and actual values Qa1 and Qa2 of engine cylinder air flow rate, calculate an ignition-timing correction-factor based upon the calculated difference, and modify the ignition timing by the calculated ignition-timing correction-factor.

Figure 25:
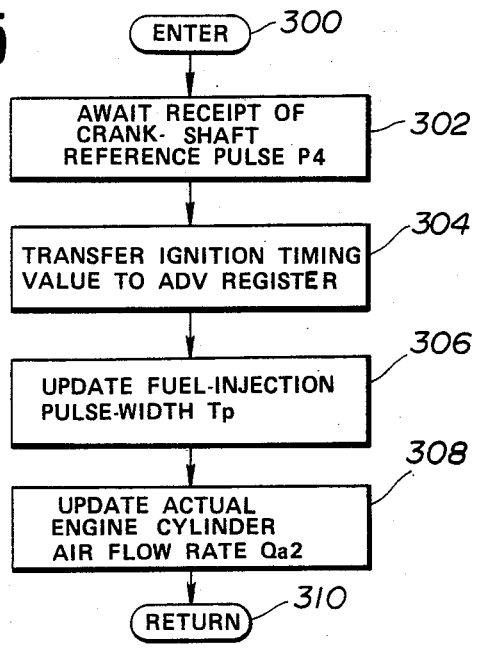
FIGS. 25 and 26 are flow diagrams of the programming of another calculation of the output-torque correction-factor.

FIG. 25 is a flow diagram of the programming of an interrupt routine performed by the digital computer in calculating the output-torque correction factor in this manner. The computer program is entered at the point 300. At the point 302 in the program, the digital computer awaits the receipt of a crankshaft reference pulse P4 which is generated from the crankshaft angle sensor 64 for each cycle of ignition of the engine. After the receipt of this crankshaft reference pulse, at the point 304, the calculated ignition timing value is set in the ignition timing logic circuit ADV registor 541. Following this, at the point 306, the fuel-injection pulse-width Tp is updated. At the point 308, the digital computer updates the actual engine cylinder air flow rate Qa2 and stores the last actual engine cylinder air flow rate Qa2' in the RAM 53. At the point 310, the computer returns to the entry point 300 to await receipt of the next crankshaft reference pulse P4.

Figure 26:
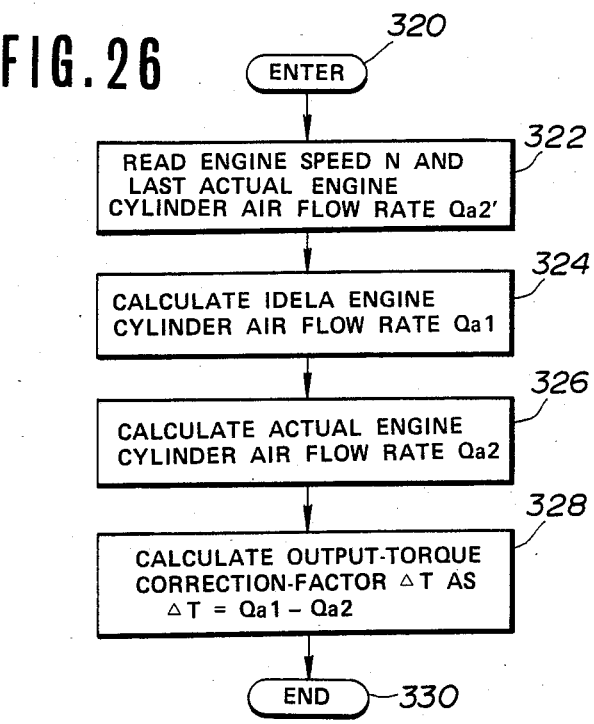

FIG. 26 is a flow diagram illustrating the above calculation of the output-torque correction-factor $\Delta T$. At the point 320 in FIG. 26, which corresponds to the point 272 of FIG. 23, the computer program is entered. At the point 322 in the program, the digital computer reads the engine speed N and the last actual engine cylinder air flow rate Qa2. At the point 324, the ideal engine cylinder air flow rate Qa1 is calculated by the digital computer as a function of engine speed N from Equation (6). At the following point 326, the digital computer calculates the actual engine cylinder air flow rate Qa2, from Equation (7), based upon the read last actual engine cylinder air flow rate Qa2' and the calculated ideal engine cylinder air flow rate Qa1. At the point 328, the output-torque correction-factor $\Delta T$ is calculated by the digital computer based upon the calculated ideal and actual values Qa1 and Qa2 of the engine cylinder air flow rate, as:

$$\Delta T = Qa1 - Qa2$$

Following the end point 330, the digital computer calculates the ignition-timing correction-factor $\Delta A$ as a function $F(\Delta T)$ of output-torque correction-factor $\Delta T$ at the point 274 of FIG. 23. For example, the function $f(\Delta T)$ may be such a function as to fulfill the condition, that is, $f(\Delta T) \geq 0$ when $\Delta T \geq \Delta T1$, $f(\Delta T) = 0$ when $\Delta T1 > \Delta t > \Delta T2$, and $f(\Delta T) \leq 0$ when $\Delta T \leq \Delta T2$, where $\Delta T1$ is a constant equal to or greater than 0 and $\Delta T2$ is a constant equal to or less than 0.

Although the output-torque correction-factor $\Delta T$ is calculated as $\Delta T = Qa1 - Qa2$ at the point 328 of FIG. 26, it is to be noted that the output-torque correction-factor $\Delta T$ may be calculated as $\Delta T = Qa1/Qa2$, in which case, the constant $\Delta T1$ is set at a value equal to or greater than 1.0 and $\Delta T2$ is set at a value ranging from 0 to 1.0.

Since the calculated ignition timing basic value is modified based upon an output-torque correction-factor, which corresponds to a difference between the actual and ideal values of the engine cylinder air flow rate Qa, in a manner to bring the actual engine output torque quite close to the ideal engine output torque, the engine output torque can change with no time lag relative to engine speed changes, thereby permitting transmission gear changes without the occurrence of engine stall at idle operation.

Since the ideal engine cylinder air flow rate Qa1 is in direct proportion to the ideal torque T1 and the actual engine cylinder air flow rate Qa2 is in direct proportion to the actual torque T2, Equations (6) and (7) may be rewritten as:

$$T1 = K2/N$$

$$T2 = (1-\alpha) \times T2' + \alpha \times T1$$

where K2 is a constant and T2' is the last actual torque calculated in the last cycle of strokes of the engine piston.

The reciprocals of the ideal and actual output torques T1 and T2 are given and approximated as:

$$1/T1 = K3 \times N \propto N$$

$$1/T2 = (1-\beta) \times (1/T2)' + \beta \times (1/T1) \propto \overline{N}$$

wherein $\overline{N} = (1-\beta) \times \overline{N}' + \beta \times N$, $(1/T2)'$ is the last value of $(1/T2)$ calculated in the last cycle of phases of the engine piston, and $\overline{N}'$ is the last value of $\overline{N}$ calculated in the last cycle of phases of the engine piston. In other words, to bring the actual Torque T2 close to the ideal torque T1, the ignition timing may be controlled in a manner to bring the existing engine speed N to the weighted average $\overline{N}$ of the engine speed.

Figure 27:
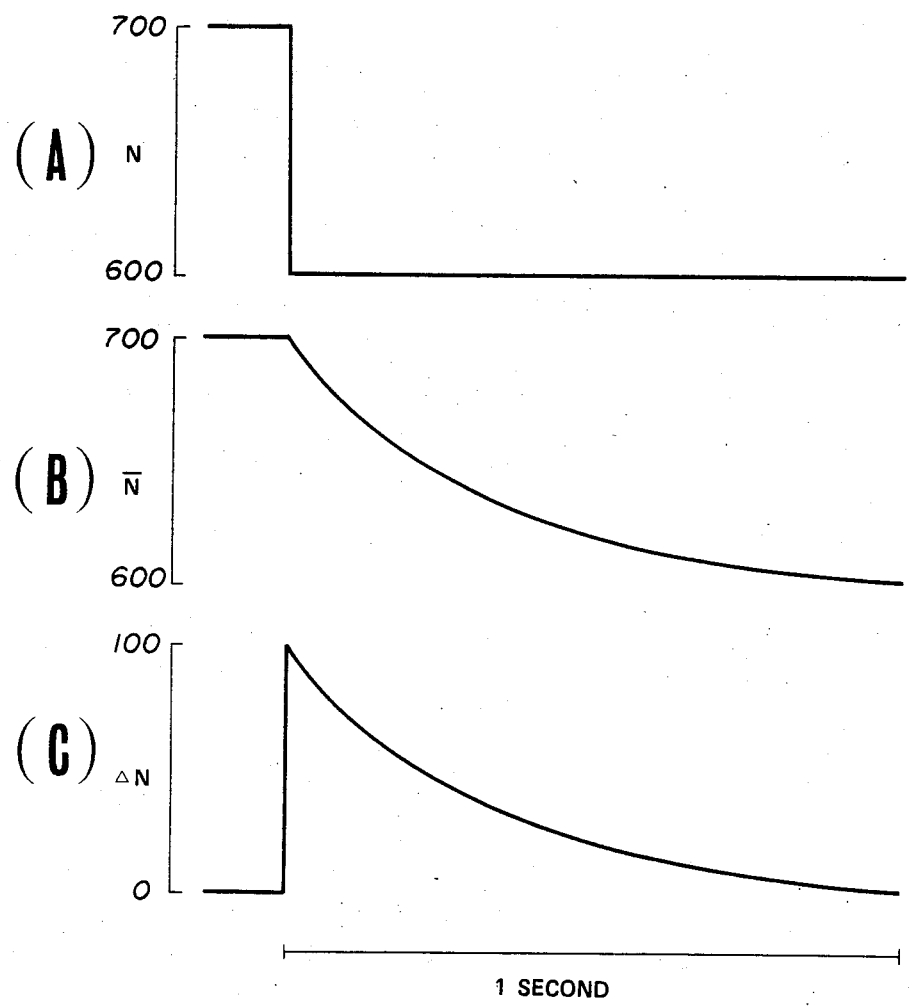
FIGS. 27(A)–(C) contain curves useful in understanding of the principles of the output-torque correction-factor calculation.

FIG. 27 illustrates the patterns of change of the engine speed weighted average $\overline{N}$ and the difference $\Delta N = (N - \overline{N})$ upon a change of the engine speed N from 700 rpm to 600 rpm. As can be seen by a comparison of FIG. 27C with FIG. 13F, the pattern of change of the difference $\Delta N = N - \overline{N}$ is substantially the same as the pattern of change of the output-torque correction-factor $\Delta T$. That is, the output-torque correction-factor $\Delta T$ may be expressed as $\Delta T = N - \overline{N} = \Delta N$.

In order to control the ignition timing in a manner to compensate for the time lag of change of the engine output torque resulting from the time lag of change of the engine cylinder air flow rate relative to a change of the engine speed N, the digital computer may calculate the difference $\Delta N = N - \overline{N}$, calculate an ignition-timing correction-factor $\Delta T$ based upon the calculated difference $\Delta N$, and modify the ignition timing by the calculated ignition-timing correction-factor.

Figure 28:
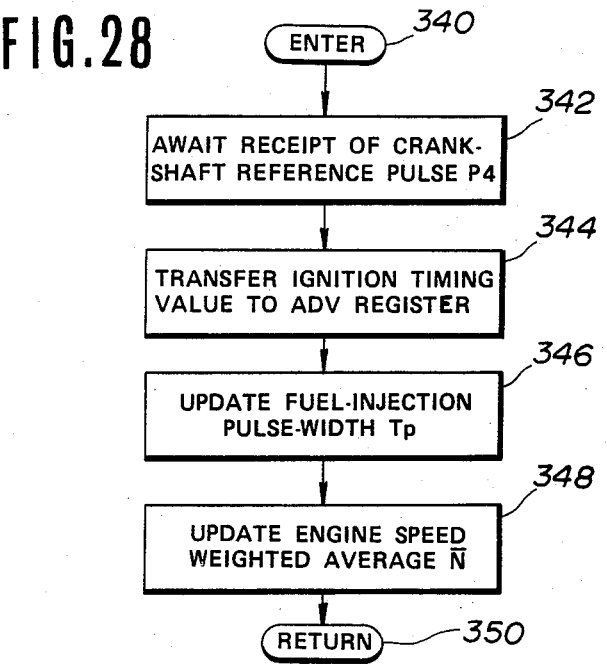
FIGS. 28 and 29 are flow diagrams illustrating still another calculation of the output-torque correction-factor.

FIG. 28 is a flow diagram of the programming of an interrupt routine performed by the digital computer in calculating the output-torque correction-factor in this manner. The computer program is entered at the point 340. At the point 342 in the program, the digital computer awiats the receipt of a crankshaft reference pulse P4 which is generated from the crankshaft angle sensor 64 for each cycle of ignition of the engine. After the receipt of this crankshaft reference pulse, at the point 344, the calculated ignition timing value is set in the ignition timing logic circuit ADV regitser 541. Following this, at the point 346, the fuel-injection pulse-width Tp is updated. At the point 348, the digital computer updates the engine speed weighted average $\overline{N}$ and stores the last engine speed weigthed average $\overline{N}$ in the RAM 53. At the point 350, the computer returns to the entry point 340 to await receipt of the next crankshaft reference pulse P4.

Figure 29:
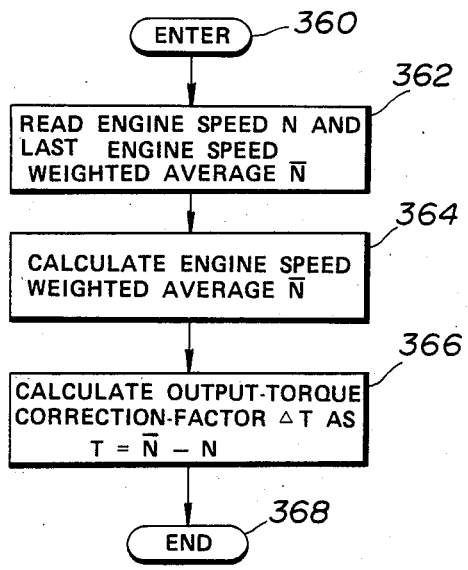

FIG. 29 is a flow diagram illustrating the above calculation of the output-torque correction-factor $\Delta T$. At the point 360 in FIG. 29, which corresponds to the point 272 of FIG. 23, the computer program is entered. At the point 362 in the program, the digital computer reads the engine speed N and the last engine speed weighted average $\overline{N}$. At the point 364, the engine speed weighted average $\overline{N}$ is calculated by the digital computer as a function of engine speed N and last engine speed weighted average as $\overline{N} = (1-\beta) \times \overline{N}' + \beta \times N$. At the point 366, the digital computer calculates the output-torque correction-factor $\Delta T$ as:

$$T = N - \overline{N}$$

Following the end point 368, the digital computer calculates the ignition-timing correction-factor $\Delta A$ as a function $f(\Delta T)$ of output-torque correction-factor $\Delta T$ at the point 274 of FIG. 23. For example, the function $f(\Delta T)$ may be such a function as to fulfill the condition, that is, $f(\Delta T) \geq 0$ when $\Delta T \geq \Delta T1$, $f(\Delta T) = 0$ when $\Delta T1 > \Delta T > \Delta T2$, and $f(\Delta T) \leq 0$ when $\Delta T \leq \Delta T2$, where $\Delta T1$ is a constant equal to or greater than 0 and T2 is a constant equal to or less than 0.

Although the output-torque correction-factor $\Delta T$ is calculated as $\Delta T = \bar{N} - N$ at the point 366 of FIG. 29, it is to be noted that the output-torque correction-factor $\Delta T$ may be calculated as $\Delta T = \bar{N}/N$, in which case, the constant $\Delta T1$ is set at a value equal to or greater than 1.0 and $\Delta T2$ is set at a value ranging from 0 to 1.0.

Since the calculated ignition timing basic value is modified based upon an output-torque correction-factor, which is calculated as a function of engine speed and engine speed weighted average and corresponds to the difference between the actual and ideal values of the engine output torque, in a manner to bring the actual engine output torque close to the ideal engine output torque, the engine output torque can change with no time lag relative to engine speed changes, thereby permitting transmission gear changes without the occurrence of engine stall at idle operation.

Although the output-torque correction-factor $\Delta T$ is calculated using the engine speed weighted average $\bar{N}$, it is to be noted that this calculation may be based upon the engine speed moving average $\bar{N}$ rather than the engine speed weighted average $\bar{N}$. The engine speed moving average $\bar{N}$ is expressed as:

$$\bar{N} = \frac{1}{n} \sum_{i=0}^{n-1} (N)i$$

wherein $(N)i$ is the engine speed N measured in the i-th cycle of strokes of the engine piston.

Figure 30:
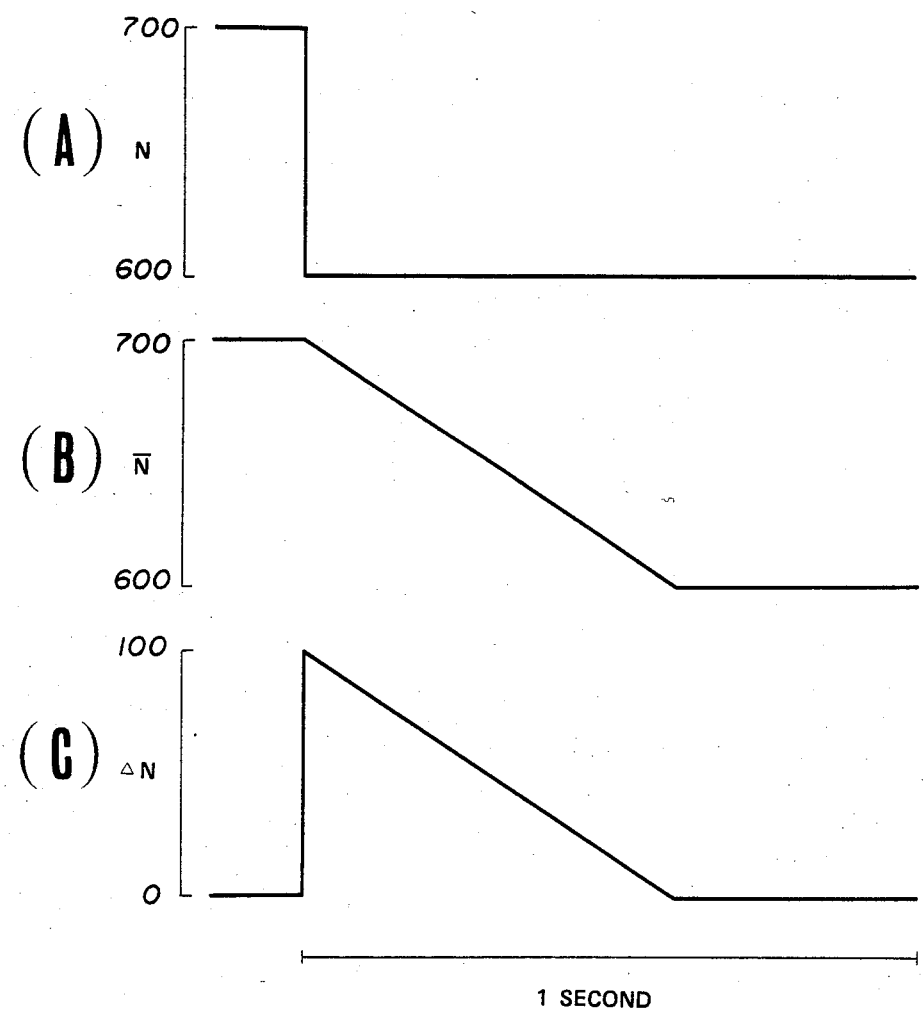
FIGS. 30(A)–(C) contain curves useful in understanding of the output-torque correction-factor calculation.

FIG. 30 illustrates the patterns of change of the engine speed moving average $\bar{N}$ and the difference $\Delta N = \bar{N} - N$ at a change of the engine speed N from 700 rpm to 600 rpm.

In addition, the fuel-injection pulse-width Tp or the actual engine cylinder air flow rate Qa2 is calculated using the weighted average, it is to be noted that this calculation may be made using the moving average as:

$$\bar{Tp} = \frac{1}{n} \sum_{i=0}^{n-1} TpSi$$

wherein TpSi is the fuel-injection pulse-width calculated in the i-th cycle of strokes of the engine piston.

Since the induction passage air flow rate Q is substantially constant at idle operation, as described hereinbefore, the fuel-injection pulse-width Tp may be calculated using the engine speed weighted average $\bar{N} = (1-\beta) \times \bar{N}' + \beta \times N$ as:

$$Tp = Q/\bar{N}$$

wherein $\beta$ is a constant.

Description will be made to an alternative embodiment of the engine control apparatus of the present invention with reference to FIGS. 31 and 32, wherein the calculated ignition timing is modified to bring the actual engine output torque close to the ideal engine output torque not only during engie idle operation but also during engine normal operation.

Figure 31:
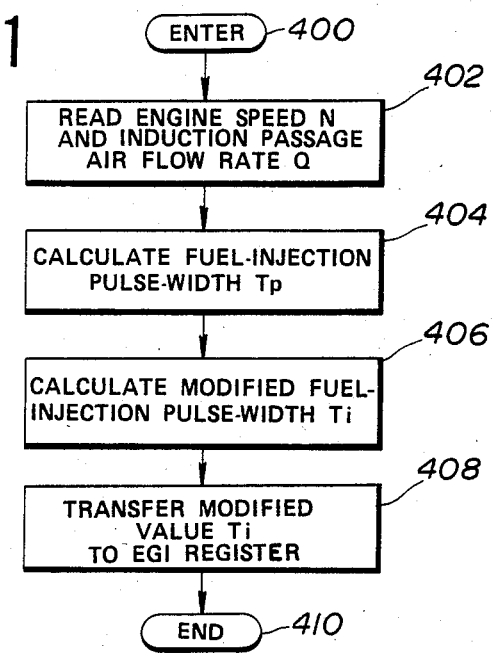
FIGS. 31 and 32 are flow diagrams useful in understanding the operation of an alternative embodiment.

FIG. 31 is a flow diagram illustrating the calculation of the fuel delivery requirement in terms of fuel-injection pulse-width Tp. At the point 400 in FIG. 31, which corresponds to the point 212 of FIG. 18, the computer program is entered. At the point 402, the digital computer reads the engine speed N stored at the address DN of the RAM 53 and the induction passage air flow Q stored at the address DQ of the RAM 53. At the point 404 in the program, the digital computer calculates the fuel-injection pulse-width Tp based upon read values of the engine speed N and the induction passage air flow Q as:

$$Tp = (1-\alpha) \times Tp' + \alpha \times K \ Q/N$$

where K is a constant and $\alpha$ is a constant selected in conjunction with the position of the idle switch 62, the engine speed N, and the induction passage air flow Q, solely or in combination. For example, the constant $\alpha$ is 1 at engine normal operation where the throttle valve is open and it is expressed at engine idle operation where the throttle valve is at or near its closed position as $\alpha = \eta \times v/V$, where $\eta$ is the volumetric efficiency, v is the cylinder stroke volume, and V is the induction passage volume.

Following this calculation, at the point 406, the calculated fuel-injection pulse-width Tp is modified for various sensed engine operating parameters, as described in connection with the point 240 of FIG. 20. At the point 408 in the program, the corrected fuel-injection pulse-width Ti is transferred to the EGI regimen 545 of the fuel injection control logic circuit (FIG. 17).

Figure 32:
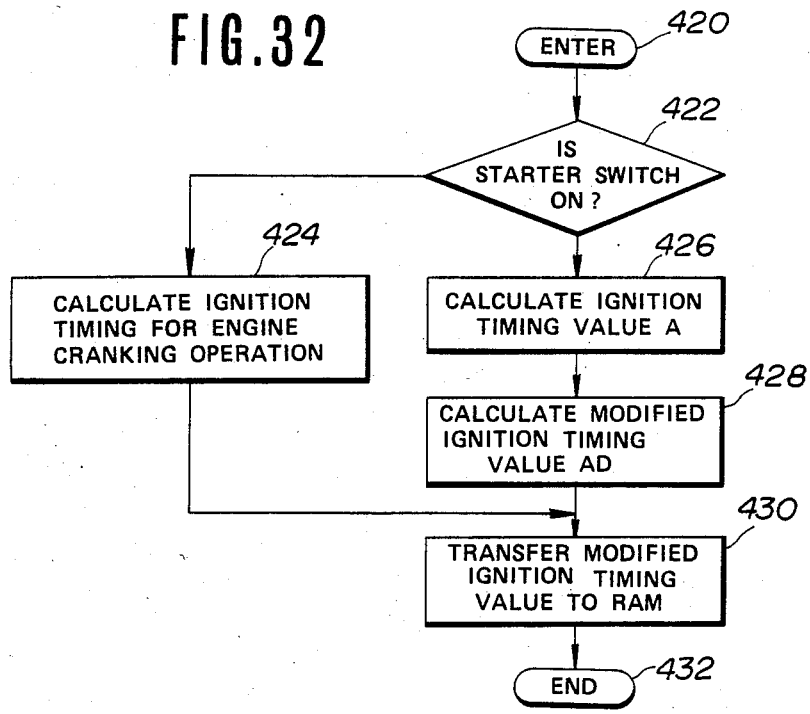

FIG. 32 is a flow diagram illustrating the calculation of the ignition timing in view of ignition spark advance. At the point 420 in FIG. 32, which corresponds to the point 241 of FIG. 18, the computer program is entered. At the point 422 in the program, a determination is made as to whether or not the starter switch 61 is "on". For this purpose, the digital computer reads the starter switch signal out of the address DI1 of the RAM 53. If the answer to this question is "yes", then it means that the engine is cranking and the program proceeds to the point 424 where the digital computer calculates an appropriate value for the ignition timing for the engine being cranking, as described in connection with the point 254 of FIG. 22. Following this, the program proceeds to the point 430 where the calculated ignition timing value is stored at a specified address ADVL of the RAM 53.

Otherwise, the computer program proceeds to the point 426 where the digital computer calculates an appropriate value A for the ignition timing based upon the engine speed N, for example, by looking at the appropriate ignition timing value A on a function table such for example as illustrated in FIG. 2. Following this, at the point 428, the calculated ignition timing value A is modified to provide an ignition timing value AD as $AD = A + f(\Delta T)$. The character $\Delta T$ indicates an output-torque correction-factor which may be calculated as shown and described in connection with the flow diagram of FIG. 24, 26 or 29. The constant $\alpha$ and $\beta$ used in calculating the output-torque correction-factor are selected in conjunction with the position of the idle switch 62, the engine speed N, and the induction passage air flow Q, solely or in combination. For example, the constant $\alpha$ is 1 at engine normal operation where the throttle valve is open and it is expressed at engine idle operation where the throttle valve is at or near its closed position as $\alpha = \eta \times v/V$, where $\eta$ is the volumetric efficiency, v is the cylinder stroke volume, and V is the induction passage volume. For example, the constant $\beta$ is 1 at normal engine operation. At the point 430, the ignition timing value AD is stored at the address ADVL of the RAM 53.

With this embodiment where the ignition timing is corrected in a manner to bring the actual engine output torque close to the ideal engine output torque during engine normal operation as well as during engine idle operation, it is possible to moderate the shock or impact resulting from engine output torque changes produced when an electric load is switched on or off or when the engine is operating under the feedback control of the air-fuel ratio.

Figure 33:
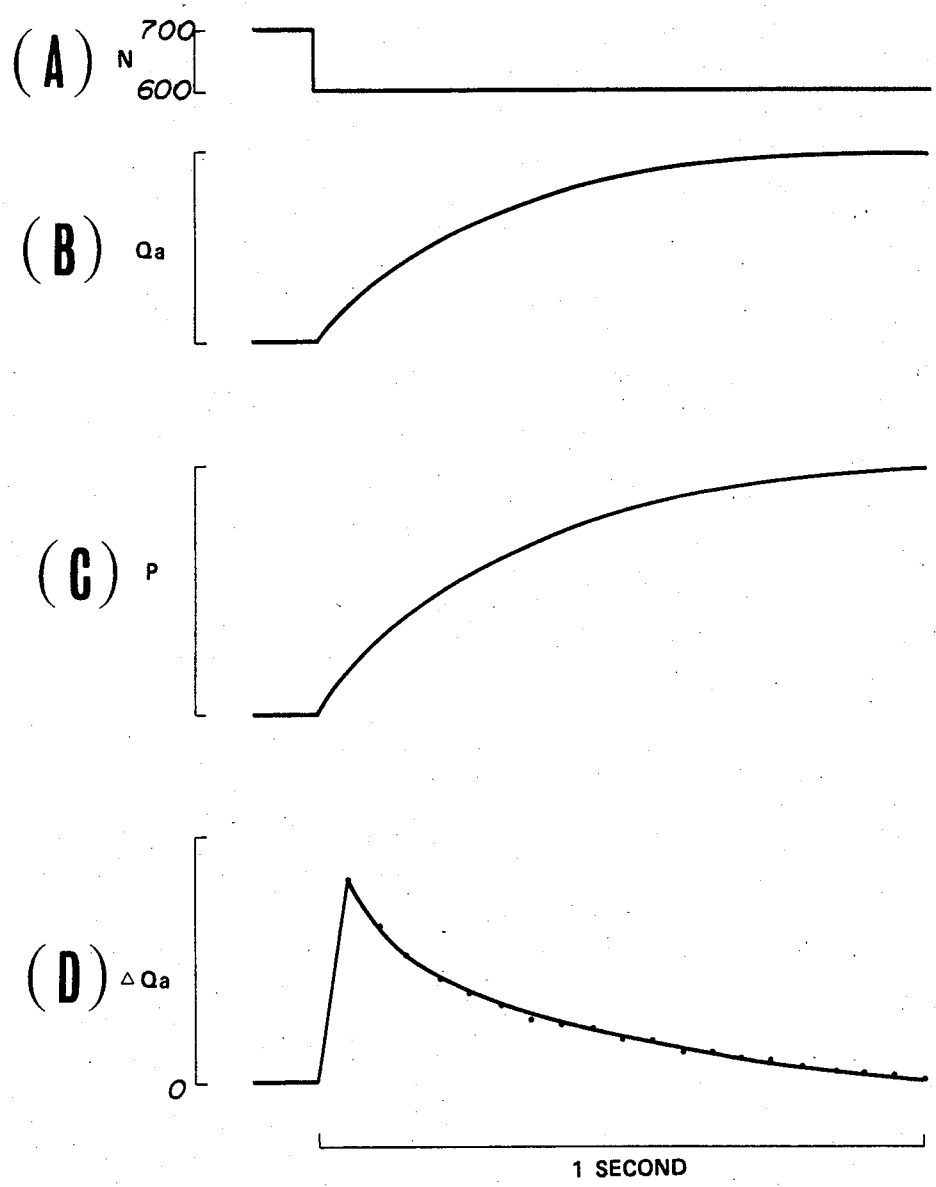
FIGS. 33(A)–(D) contain curves useful in understanding of the fuel-injection pulse-width and ignition timing calculations performed as a function of intake-manifold absolute pressure.

FIG. 33 illustrates changes of the actual engine cylinder air flow rate Qa (FIG. 33B) and the intake manifold absolute pressure P (FIG. 33C) upon a stepped change of the engine speed N (FIG. 33A) at idle operation. As can be seen from a comparison of FIGS. 33B and 33C, the pattern of change of the intake manifold absolute pressure P is substantially identical to the pattern of change of the engine cylinder air flow rate Qa. Therefore, it is to be understood that the actual engine cylinder air flow rate Qa can be expressed as $Qa = f(P)$ or $Qa = g(N, P)$ and the fuel-injection pulse-width Tp which determines the amount of fuel to the engine may be calculated as:

$$Tp = K \times Qa$$

where K is a constant.

In addition, FIG. 33A illustrates the change $\Delta Qa$ of the actual engine cylinder air flow rate Qa upon the stepped change of the engine speed N. As can be seen from a comparison of FIG. 33D and FIG. 13F, the pattern of change of the actual engine cylinder air flow rate change $\Delta Qa$ is substantially identical to the pattern of change of the output-torque correction-factor $\Delta t$. Therefore, the output-torque correction-factor $\Delta T$ may be expressed as:

$$\Delta T \propto Qa \propto Tp - Tp'$$

where Tp' is the fuel-injection pulse-width calculated in the last cycle of strokes of the engine piston.

The ignition-timing correction factor $\Delta A$ as a function $F(\Delta T)$ of the output-torque correction-factor $\Delta T$. For example, the function $F(\Delta T)$ may be such a function as to fulfill the condition, that is, $f(\Delta T) \geq 0$ when $\Delta T \geq \Delta T1$, $f(\Delta T) = 0$ when $\Delta T1 > \Delta T > T2$, and $f(\Delta T) \leq 0$ when $\Delta T \leq \Delta T2$, wherein $\Delta T1$ is a constant equal to or greater than 0 and $\Delta T2$ is a constant equal to or less than 0. The calculated ignition timing basic value A is modifies for the calculated ignition-timing correction factor A as:

$$AD = A + \Delta A$$

The calculated ignition timing value AD is stored at the address ADVL of the RAM 53.

Since the calculated ignition timing is modified based upon an output-torque correction-factor corresponding to the change of the actual engine cylinder air flow rate, the engine output torque comes close to the ideal engine output torque which changes with no time lag relative to a change of the engine speed.

Therefore, is to be understood that the measurement of the intake manifold absolute pressure P may be used in place of the measurement of the induction passage air flow Q in calculating the required fuel-injection pulse-width Tp and ignition timing. Consequently, the airflow sensor 63 can be replaced by an intake-manifold absolute-pressure sensor 66. This replacement can reduce costs.

It is to be understood that the term "idle operation" as used throughout this invention is intended to mean at least one of conditions, that is, (1) when the throttle valve is at or near its closed position, (2) when the throttle valve is at or near its closed position and the engine speed is less than a predetermined value, (3) when the throttle valve is at or near its closed position and the transmission is in neutral, and (4) when the throttle valve is at or near its closed position and the induction passage air flow, the fuel-injection pulse-width Tp, or the intake-manifold absolute-pressure P is less than a predetermined value.

While this invention has been described in conjunction with specific embodiments thereof, it is evident that many alternatives, modifications and variations will be apparent to one skilled in the art. Accordingly, it is intended to embrace all alternatives, modifications, and variations that fall within the spirit and broad scope of the appended claims.

What is claimed is:

1. A method of controlling an internal combustion engine having an induction passage leading to at least one cylinder for generating a torque on its output shaft, comprising the steps of:
   generating a first signal indicative of the speed of said engine output shaft;
   generating a second signal indicative of a selected engine operating parameter;
   calculating a first value for the rate of air flow introduced into said engine cylinder based upon said first and second signals;
   calculating a second value for the amount of fuel to be delivered into said engine cylinder based upon said first value, said second value being substantially in direct proportion to said first value;
   calculating a basic value for the timing of ignition in said engine cylinder based upon at least one of said first and second signals;
   calculating an output-torque correction-factor based upon at least one of said first and second signals, said output-torque correction-factor being substantially in direct proportion to a difference between an actual torque actually produced on said engine output shaft and an ideal torque required on said engine output shaft at the engine speed;
   modifying said calculated ignition timing basic value based upon said calculated output-torque correction-factor to provide a value for the timing of ignition in said engine cylinder, thereby bringing the actual torque close to the ideal torque.

2. The engine control method as claimed in claim 1, wherein said second signal has a third value corresponding to the air flow introduced into said induction passage.

3. The engine control method as claimed in claim 2, wherein said second value Tp is calculated repetitively for each cycle of ignition of said engine as:

$$Tp = (1 - \alpha) \times Tp' + \alpha \times K \times Q/N$$

where $\alpha$ is a constant which is equal to 1 at normal engine operation and is dependent upon at least one engine operating parameter at engine idle operation, K is a constant, Tp' is the second value calculated in the last cycle of ignition in said engine cylinder, Q is the third value, and N is the engine speed.

4. The engine control method as claimed in claim 2, wherein, at engine idle operation, said second value Tp is calculated repetitively for each cycle of ignition of said engine as:

$$Tp = K \times \frac{1}{n} \sum_{i=0}^{n-1} Qi/Ni$$

where K is a constant, Ni is the engine speed calculated in the i-th cycle of ignition in said engine cylinder, and Qi is the induction passage air flow measured in the i-th cycle of ignition in said engine cylinder.

5. The engine control method as claimed in claim 1, wherein said step of modifying said calculated ignition timing basic value comprises the steps of:
   calculating an ignition-timing correction-factor as a function of said calculated output-torque correction-factor; and
   modifying said calculated ignition timing basic value based upon said calculated ignition-timing correction-factor.

6. The engine control method as claimed in claim 5, wherein said ignition timing basic value modification is performed by adding said ignition-timing correction-factor to said calculated ignition timing basic value.

7. The engine control method as claimed in claim 5, wherein said ignition timing basic value modification is performed by multiplying said calculated ignition timing basic value by said ignition-timing correction-factor.

8. The engine control method as claimed in claim 5, wherein said output-torque correction-factor is calculated based upon a difference between the first value calculated during engine normal operation and the first value calculated during engine idle operation.

9. The engine control method as claimed in claim 8, wherein said second signal has a third value corresponding to the air flow introduced into said induction passage, and wherein said first value Qa2 is calculated repetitively for each cycle of ignition in said engine cylinder as:

$$Qa2 = (\delta - \alpha) \times Qa2' + \alpha \times K \times Q/N$$

where $\alpha$ is a constant which is equal to 1 at engine normal operation and is dependent upon at least one engine operating parameter at engine idle operation, K is a constant, Qa2' is the first value calculated in the last cycle of ignition in said engine cylinder, Q is the third value, and N is the engine speed.

10. The engine control method as claimed in claim 8, wherein said second signal has a third value corresponding to the air flow introduced into said induction passage, and wherein, at engine idle operation, said first value Qa2 is calculated repetitively for each cycle of ignition in said engine cylinder as:

$$Qa2 = K \times \frac{1}{n} \sum_{i=0}^{n-1} Qi/Ni$$

where K is a constant, Ni is the engine speed calculated in the i-th cycle of ignition in said engine cylinder, and Qi is the induction passage air flow measured in the i-th cycle of ignition in said engine cylinder.

11. The engine control method as claimed in claim 5, wherein said output-torque correction-factor is calculated based upon a difference between the second value calculated during engine normal operation and the second value calculated during engine idle operation.

12. The engine control method as claimed in claim 11, wherein said second signal has a third value corresponding to the air flow introduced into said induction passage, and wherein said second value Tp is calculated repetitively for each cycle of ignition in said engine cylinder as:

$$Tp = (1-\alpha) \times Tp' + \alpha \times K \times Q/N$$

where $\alpha$ is a constant which is equal to 1 at engine normal operation and is dependent upon at least one engine operating parameter, K is a constant, Tp' is the second value calculated in the last cycle of ignition in said engine cylinder, Q is the third value, and N is the engine speed.

13. The engine control method as claimed in claim 11, wherein said second signal has a third value corresponding to the air flow introduced into said induction passage, and wherein, at engine idle operation, said second value Tp is calculated repetitively for each cycle of ignition in said engine cylinder as:

$$Tp = K \times \frac{1}{n} \sum_{i=0}^{n-1} Qi/Ni$$

where K is a constant, Ni is the engine speed calculated in the i-th cycle of ignition in said engine cylinder, and Qi is the induction passage air flow measured in the i-th cycle of ignition in said engine cylinder.

14. The engine control method as claimed in claim 5, wherein said output-torque correction-factor is calculated based upon a difference between the engine speed and an engine speed weighted average calculated as a function of engine speed.

15. The engine control method as claimed in claim 14, wherein the engine speed weighted average $\overline{N}$ is repetitively calculated for each cycle of ignition in said engine cylinder as:

$$\overline{N} = (1-\beta) \times \overline{N}' + \beta \times N$$

where $\beta$ is a constant and $\overline{N}'$ is the engine speed weighted average $\overline{N}$ calculated in the last cycle of ignition in said engine cylinder.

16. The engine control method as claimed in claim 5, wherein said output-torque correction-factor is calculated based upon a difference between the engine speed and an engine speed moving average.

17. The engine control method as claimed in claim 16, wherein the engine speed moving average N is repetitively calculated for each cycle of ignition in said engine cylinder as:

$$\overline{N} = \frac{1}{n} \sum_{i=0}^{n-1} (N)i$$

where $(N)i$ is the engine speed measured in the i-th cycle of ignition in said engine cylinder.

* * * * *